US010820567B2

(12) United States Patent
Garrett et al.

(10) Patent No.: US 10,820,567 B2
(45) Date of Patent: Nov. 3, 2020

(54) DISPOSABLE AND PORTABLE LITTER BOX

(71) Applicant: Maple Mountain Pet Stuff, LLC, South Burlington, VT (US)

(72) Inventors: Diane K. Garrett, South Burlington, VT (US); Roy Paul Prosise, Cedar Park, TX (US); Benjamin Derek Litteral, Austin, TX (US); Daniel Caputo, Cedar Park, TX (US)

(73) Assignee: DKG, LLC, South Burlington, VT (US)

( * ) Notice: Subject to any disclaimer, the term of this patent is extended or adjusted under 35 U.S.C. 154(b) by 0 days.

(21) Appl. No.: 16/419,267

(22) Filed: May 22, 2019

(65) Prior Publication Data

US 2019/0357494 A1 Nov. 28, 2019

Related U.S. Application Data

(60) Provisional application No. 62/674,958, filed on May 22, 2018.

(51) Int. Cl.
| | |
|---|---|
| *A01K 29/00* | (2006.01) |
| *A01K 1/01* | (2006.01) |
| *B31B 50/60* | (2017.01) |
| *B31B 50/26* | (2017.01) |
| *B31B 50/74* | (2017.01) |
| *B65D 81/36* | (2006.01) |
| *B65D 5/32* | (2006.01) |
| *B31B 120/10* | (2017.01) |
| *B31B 110/35* | (2017.01) |
| *B31B 120/30* | (2017.01) |

(52) U.S. Cl.
CPC ............ *A01K 1/0125* (2013.01); *B31B 50/26* (2017.08); *B31B 50/60* (2017.08); *B31B 50/742* (2017.08); *B65D 5/321* (2013.01); *B65D 81/36* (2013.01); *B31B 2110/35* (2017.08); *B31B 2120/10* (2017.08); *B31B 2120/302* (2017.08)

(58) Field of Classification Search
CPC .... A01K 1/015; A01K 1/0107; A01K 1/0125; B31B 50/60–734; B31B 5/321
USPC ......................................... 119/161, 165, 168
See application file for complete search history.

(56) References Cited

U.S. PATENT DOCUMENTS

| | | |
|---|---|---|
| 3,486,680 A | 12/1969 | Negus, Jr. |
| 3,581,977 A | 6/1971 | Kirksy et al. |
| 4,305,544 A | 12/1981 | Noonan |
| 4,548,160 A | 10/1985 | Feitelson |
| 4,553,671 A | 11/1985 | Cheesman |
| 4,648,349 A | 3/1987 | Larson |

(Continued)

*Primary Examiner* — David J Parsley
*Assistant Examiner* — Danielle A Clerkley
(74) *Attorney, Agent, or Firm* — Intrinsic Law Corp.

(57) ABSTRACT

A portable and disposable litter box includes a bottom tray, a top tray, and an insert. The insert includes insert sidewalls that are attached to the bottom tray. The litter box is configurable in open and closed states. In the closed state, the top tray is disposed on the bottom tray and a litter box cavity is defined between the bottom and top trays, and the insert sidewalls are pivoted inwardly such that the insert sidewalls are disposed in the litter box cavity. In the opened state, the top tray is pivoted away from the bottom tray, and the insert sidewalls are pivoted outwardly such that the insert sidewalls extend from the bottom tray to the top tray.

34 Claims, 25 Drawing Sheets

(56) References Cited

U.S. PATENT DOCUMENTS

| | | | | |
|---|---|---|---|---|
| 4,711,198 A | * | 12/1987 | Mossbarger | A01K 1/0125 119/168 |
| 4,779,567 A | * | 10/1988 | Smith | A01K 1/0107 119/165 |
| 4,807,563 A | | 2/1989 | Berry et al. | |
| 4,807,564 A | * | 2/1989 | Soberg | A01K 1/0107 119/168 |
| 4,846,103 A | * | 7/1989 | Brown | A01K 1/0125 119/168 |
| 4,940,016 A | * | 7/1990 | Heath | A01K 1/0125 119/168 |
| 4,967,692 A | * | 11/1990 | Mills | A01K 1/0125 119/168 |
| 4,976,218 A | * | 12/1990 | Cirami | A01K 1/0125 119/168 |
| 5,035,205 A | | 7/1991 | Schiller et al. | |
| 5,080,044 A | * | 1/1992 | Bosworth | A01K 1/0125 119/168 |
| 5,080,046 A | * | 1/1992 | Cassone | A01K 1/0125 119/165 |
| 5,129,364 A | * | 7/1992 | Pirkle | A01K 1/0125 119/167 |
| 5,144,914 A | * | 9/1992 | Giannakopoulos | A01K 1/0107 119/168 |
| 5,211,134 A | * | 5/1993 | Bolo, III | A01K 1/0107 119/168 |
| 5,566,641 A | * | 10/1996 | Radli | A01K 1/0125 119/168 |
| 5,655,479 A | * | 8/1997 | Armington | A01K 1/0125 119/168 |
| 5,727,499 A | * | 3/1998 | Armington | A01K 1/0125 119/168 |
| 5,730,085 A | * | 3/1998 | Santoiemmo | A01K 1/0125 119/168 |
| 5,845,601 A | * | 12/1998 | Robinson | A01K 1/0125 119/168 |
| 5,913,282 A | * | 6/1999 | Indes | A01K 1/0125 119/168 |
| 6,382,131 B1 | * | 5/2002 | McGivern | A01K 1/0125 119/165 |
| D513,817 S | * | 1/2006 | Miller | D30/161 |
| 8,256,380 B2 | * | 9/2012 | Bjornson | A01K 1/0125 119/168 |
| D690,059 S | | 9/2013 | Robbins | |
| D711,601 S | | 8/2014 | Robbins | |
| 8,869,744 B2 | | 10/2014 | Noonan | |
| 9,374,977 B2 | | 6/2016 | Robbins | |
| 10,206,370 B2 | * | 2/2019 | Huang | A01K 1/0114 |
| 2009/0126643 A1 | * | 5/2009 | Fountain | A01K 1/0107 119/165 |
| 2009/0241851 A1 | * | 10/2009 | Peddycoart | A01K 1/0107 119/168 |
| 2010/0300367 A1 | * | 12/2010 | Askinasi | A01K 1/0107 119/161 |
| 2015/0196004 A1 | * | 7/2015 | Norman | A01K 1/0107 119/165 |
| 2015/0245588 A1 | * | 9/2015 | Perorazio | A01K 1/0107 119/166 |

* cited by examiner

Steps 2 and 3

Step 4

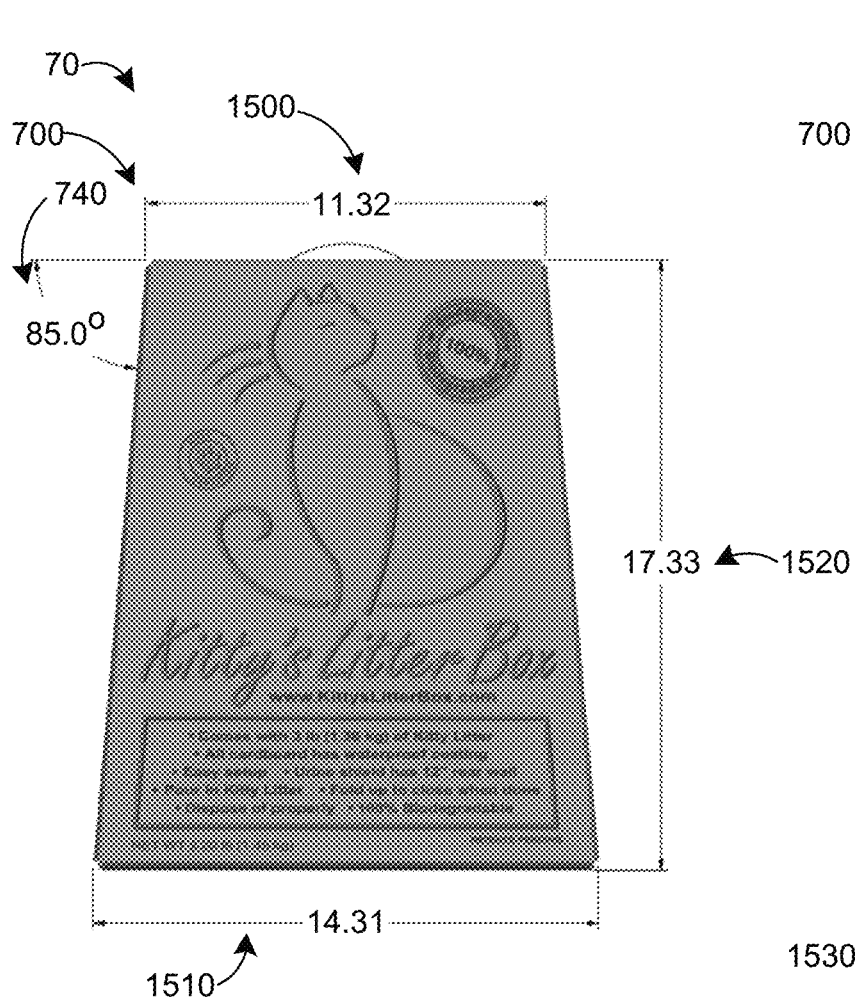
FIG. 15A
FIG. 15B

1700

1700

DISPOSABLE AND PORTABLE LITTER BOX

CROSS-REFERENCE TO RELATED APPLICATIONS

This application claims priority to U.S. Provisional Patent Application No. 62/674,958, titled "Disposable and Portable Litter Box," filed on May 22, 2018, which is hereby incorporated by reference.

TECHNICAL FIELD

This application relates generally to waste containers for pets, such as cat litter boxes.

BACKGROUND

Existing litter boxes are generally in the form of a tray or an open box. Though this design provides flexibility with locating the litter box within the home, it also has several disadvantages. For example, existing litter boxes do not prevent urine from spraying onto the surrounding floor and walls. In addition, existing litter boxes are messy to clean up. Further, they are not easily transportable while holding kitty litter.

It would be desirable to overcome one or more of these and/or other problems with existing litter boxes.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a litter box comprising: a bottom tray having a bottom tray base, bottom tray sidewalls, a bottom tray front wall, and a bottom tray back wall; a top tray having a top tray base, top tray sidewalls, a top tray front wall, and a top tray back wall, the top tray pivotably attached to the bottom tray; and an insert comprising insert sidewalls that are attached to the bottom tray. In a closed state, the top tray is disposed on the bottom tray and a litter box cavity is defined between the bottom and top trays, and the insert sidewalls are pivoted inwardly such that the insert sidewalls are disposed in the litter box cavity. In an opened state, the top tray is pivoted away from the bottom tray, and the insert sidewalls are pivoted outwardly such that the insert sidewalls extend from the bottom tray to the top tray.

In one or more embodiments, a height of each insert sidewall is determined with respect to an axis that is orthogonal to a plane defined by an inner exposed surface of the bottom tray base. In one or more embodiments, each insert sidewall has a first end disposed proximal to the bottom tray front wall and a second end disposed proximal to the bottom tray back wall, and the height of each insert sidewall increases from the first end to the second end. In one or more embodiments, each insert sidewall extends along a length of a corresponding bottom tray sidewall. In one or more embodiments, the height at the first end of each insert sidewall is greater than a height of the corresponding bottom tray sidewall. In one or more embodiments, the height at the first end of each insert sidewall is at least twice the height of the corresponding bottom tray sidewall.

In one or more embodiments, each insert sidewall is attached to a corresponding bottom tray sidewall. In one or more embodiments, in the opened state each insert sidewall is releasably attached to the top box. In one or more embodiments, each insert sidewall is releasably attached to the top box by a zip tie.

In one or more embodiments, a separation distance between the bottom tray sidewalls is smaller at a first bottom tray end proximal to the bottom tray front wall than at a second bottom tray end proximal to the bottom tray back wall. In one or more embodiments, a separation distance between the top tray sidewalls is smaller at a first top tray end proximal to the top tray front wall than at a second top tray end proximal to the top tray back wall. In one or more embodiments, the bottom tray includes double-folded corners. In one or more embodiments, each double-folded corner is disposed between the bottom tray base, the bottom tray back wall, and a corresponding bottom tray sidewall.

In one or more embodiments, the bottom tray comprises a waterproof or a water-resistant material. In one or more embodiments, the insert sidewalls are integrally attached to the bottom tray.

Another aspect of the invention is directed to a litter box comprising: a bottom tray having a bottom tray base, bottom tray sidewalls, a bottom tray front wall, and a bottom tray back wall; a top tray having a top tray base, top tray sidewalls, a top tray front wall, and a top tray back wall, the top tray pivotably attached to the bottom tray; and an insert comprising insert sidewalls that are attached to the top tray. In a closed state, the top tray is disposed on the bottom tray and a litter box cavity is defined between the bottom and top trays, and the insert sidewalls are pivoted inwardly such that the insert sidewalls are disposed in the litter box cavity. In an opened state, the top tray is pivoted away from the bottom tray, and the insert sidewalls are pivoted outwardly such that the insert sidewalls extend from the bottom tray to the top tray.

In one or more embodiments, a height of each insert sidewall is determined with respect to an axis that is orthogonal to a plane defined by an inner exposed surface of the bottom tray base, each insert sidewall has a first end disposed proximal to the bottom tray front wall and a second end disposed proximal to the bottom tray back wall, and the height of each insert sidewall increases from the first end to the second end. In one or more embodiments, the height at the first end of each insert sidewall is greater than a height of the corresponding bottom tray sidewall.

In one or more embodiments, a bottom tray separation distance between the bottom tray sidewalls is smaller at a first bottom tray end proximal to the bottom tray front wall than at a second bottom tray end proximal to the bottom tray back wall, and a top tray separation distance between the top tray sidewalls is smaller at a first top tray end proximal to the top tray front wall than at a second top tray end proximal to the top tray back wall. In one or more embodiments, the bottom tray includes double-folded corners.

IN THE DRAWINGS

For a fuller understanding of the nature and advantages of the technology, reference is made to the following detailed description of preferred embodiments.

FIGS. 15A and 15B are top and side views, respectively, of the litter box illustrated in FIG. 7 in a closed state to illustrate example dimensions.

DETAILED DESCRIPTION

Figure 1:
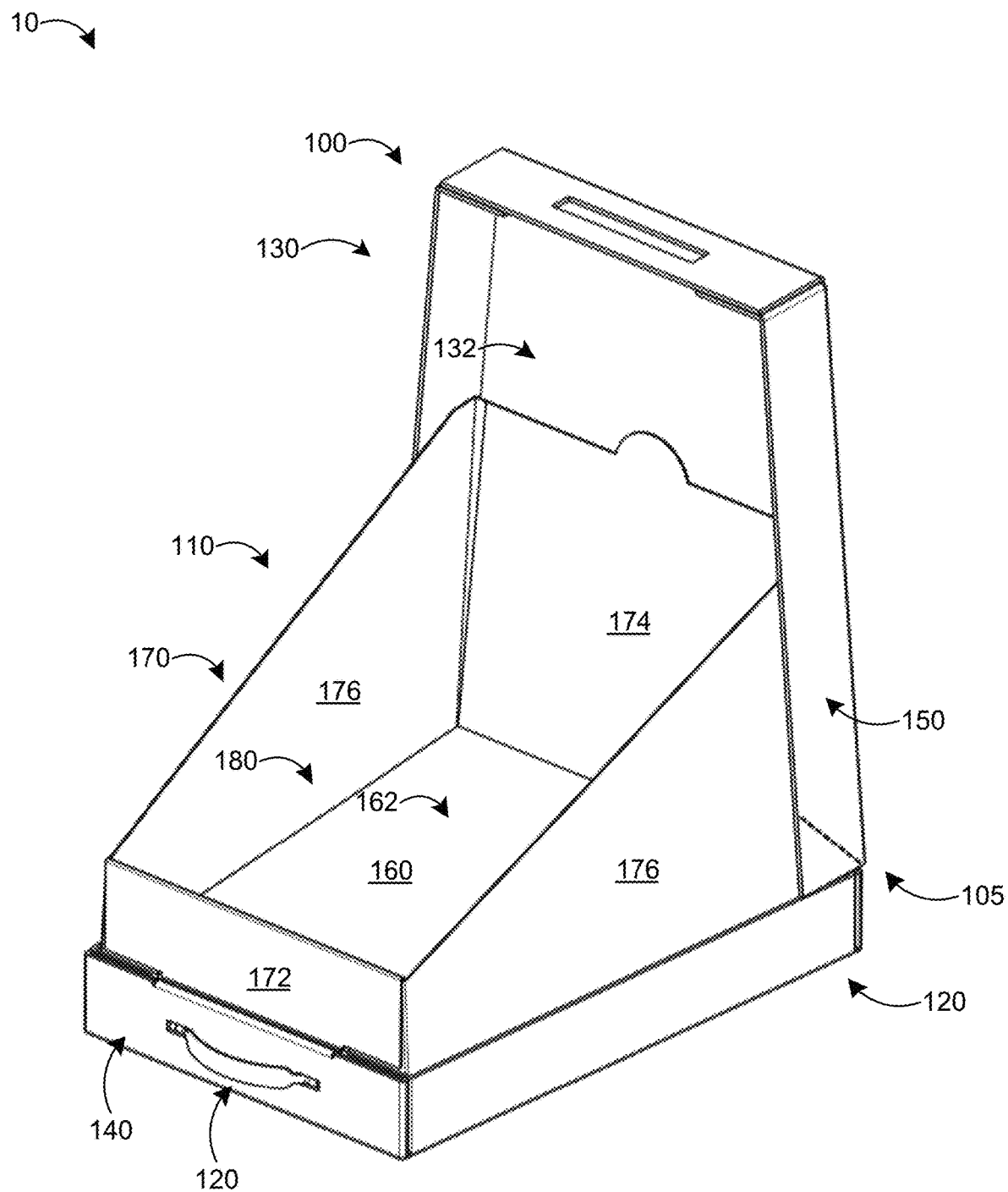
FIG. 1 is a perspective view of a disposable and/or collapsible litter box in an opened state according to one or more embodiments.

A disposable and/or portable litter box includes an outer container and an insert that includes raised sidewalls. The insert sidewalls can be attached (e.g., glued, taped, stapled, etc.) and/or integrally attached to the outer container (e.g., to an upper or lower portion of the outer container).

The litter box can be in an (a) opened state or (b) stowed, folded, and/or collapsed state (in general, a closed state). In the opened state, the outer container is opened, and the insert sidewalls are expanded or unfolded to define an internal space for a cat (or another pet) to enter to urinate and/or defecate. The insert sidewalls are raised to contain urine that the cat may spray while using the litter box. The outer container includes a raised rear wall that prevents the cat from urinating and/or defecating over the back of the litter box. The distance between the insert sidewalls can increase or expand from the front to the rear of the litter box to encourage the cat to stand and/or sit in the rear of the inner container facing forwards (i.e., towards the front of the inner container). In addition, the height of the insert sidewalls increases from the front to the rear of the litter box, which can further encourage the cat to stand and/or sit in the rear of the inner container facing forwards. The raised rear wall and lower front wall of the outer container can also encourage the cat to face forwards.

The base of the outer container can hold kitty litter, which can be disposed directly on the base or in a container or pan that is disposed on the base. The outer container can be waterproof or water resistant to retain the cat's urine. In addition, or in the alternative, a waterproof or water-resistant layer or material can be disposed on or within the outer container material. The insert sidewalls can also be waterproof and/or water resistant. In addition or in the alternative, a waterproof and/or a water-resistant tray can be disposed in the outer container to hold the kitty litter. When the outer container includes such a tray, the outer container can optionally not include a waterproof and/or a water-resistant material.

In the closed state, the insert sidewalls are folded, pivoted, and/or rotated inwardly towards the outer container's base to minimize the insert sidewalls' height. This reduction in height allows the outer container to close to put the litter box in the closed state. In the closed state, the litter box can be transported (e.g., shipped to the customer, moved to a different room, moved to a different location while travelling, etc.). In addition, the litter box can be placed in the closed state when it is thrown away, for example to save space and reduce odor.

In some embodiments, the litter box is formed fully or partially out of biodegradable materials to reduce the environmental impact of throwing the litter box away at the end of the kitty litter's life. In addition, or in the alternative, the litter box can be formed fully or partially out of nontoxic materials.

In some embodiments, the outer container includes the insert sidewalls. For example, the sidewalls of the outer container and the insert sidewalls can be integrally formed together.

In an alternative embodiment, the litter box includes an outer container and an inner container. The inner container includes raised sidewalls to contain urine that the cat may spray while using the litter box. The outer container includes a raised rear wall that prevents the cat from urinating and/or defecating over the back of the litter box. The distance between the inner container's sidewalls can increase or expand from the front of the inner container to the rear of the inner container to encourage the cat to stand and/or sit in the rear of the inner container facing forwards (i.e., towards the front of the inner container). In addition, the raised rear wall and lower front wall of the outer container encourages the cat to face forwards.

Figure 5A:
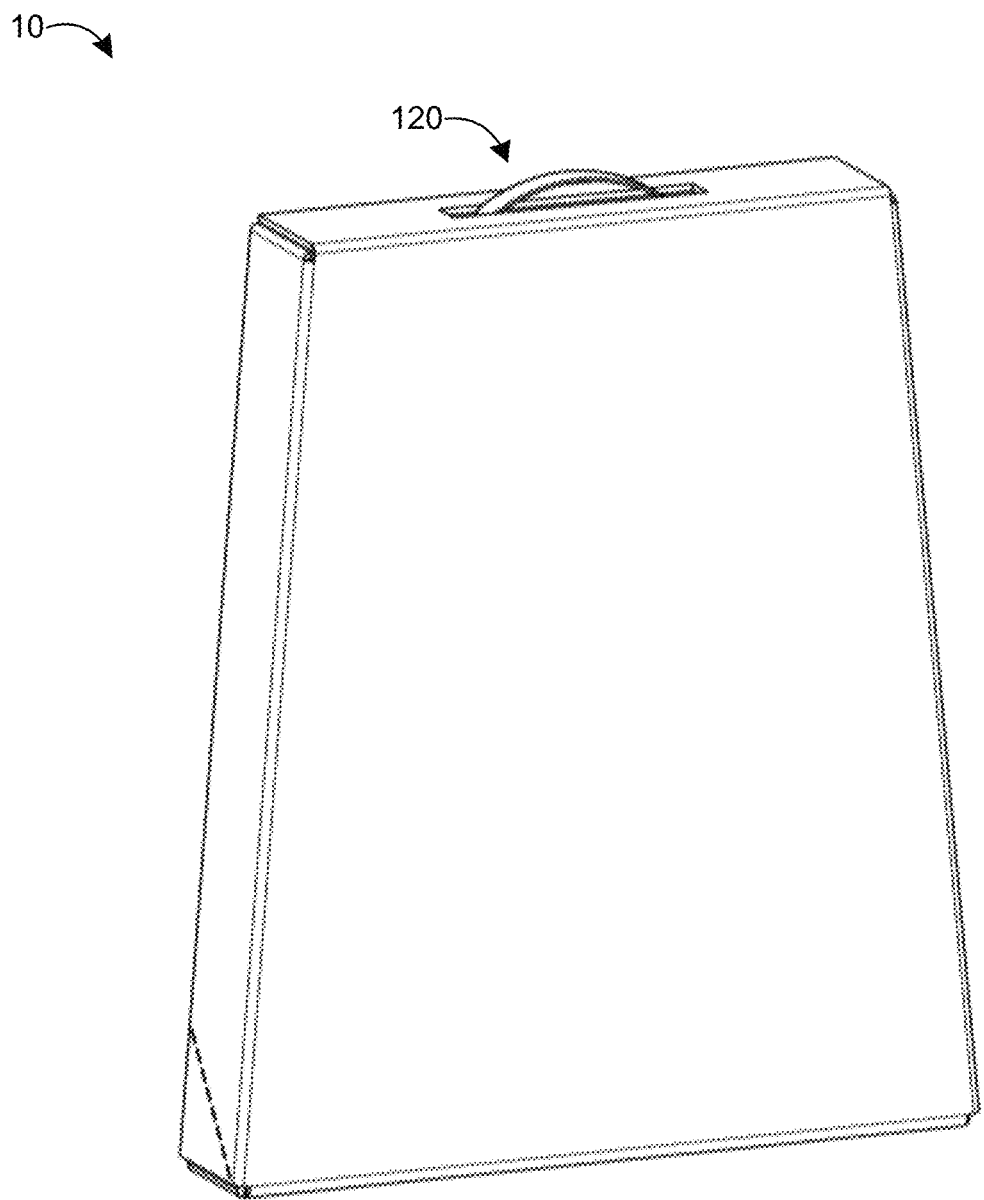
FIGS. 5A and 5B are perspective views that illustrate the litter box illustrated in FIG. 1 in a closed state according to one or more embodiments.
Figure 5B:
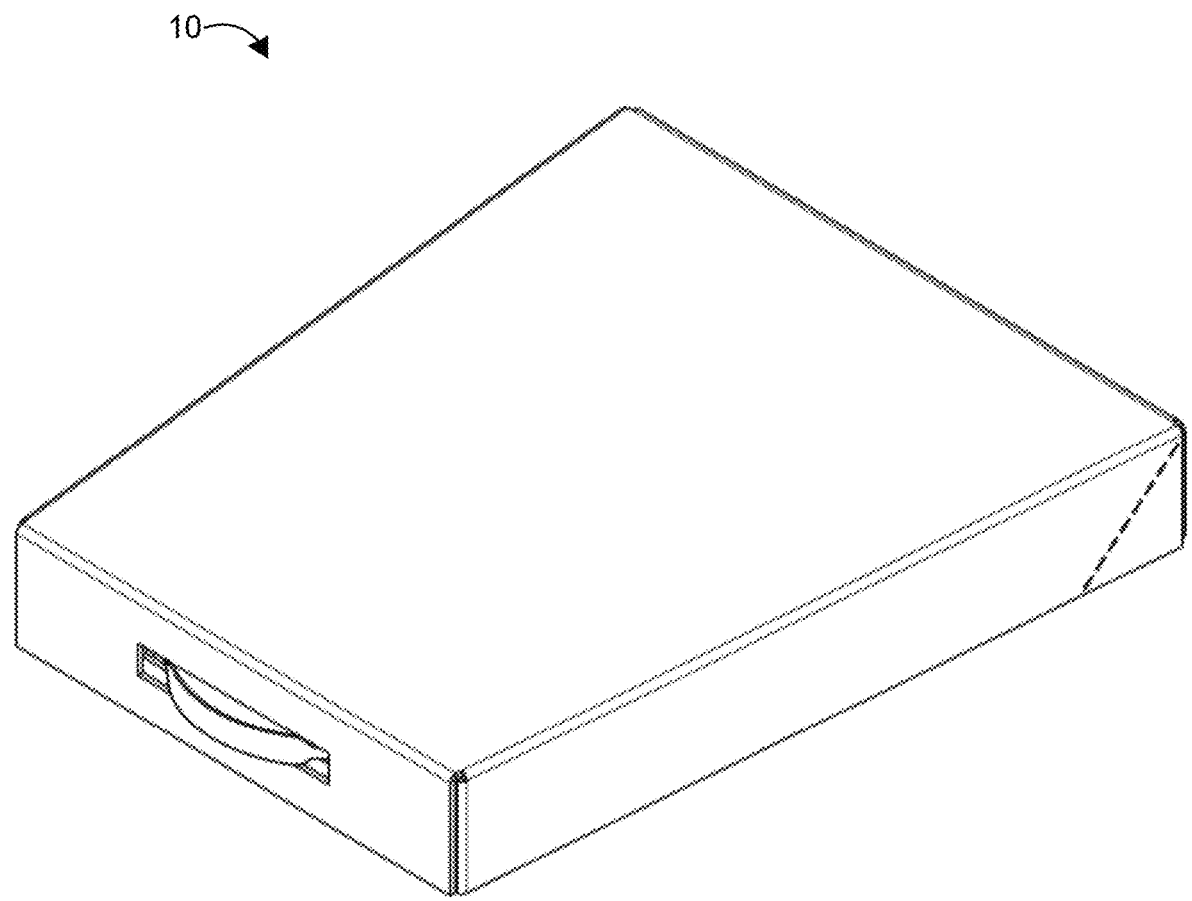

FIG. 1 is a perspective view of a disposable and/or collapsible litter box 10 in a deployed state according to one or more embodiments. The litter box 10 includes an outer container 100, an inner container 110, and a handle 120. The outer container 100 includes a top portion 130 and a bottom portion 140 that are connected together at a connection interface 105. The connection interface 105 functions as a rotation or pivot point that allows the top and bottom portions 130, 140 to rotate or pivot with respect to each other, thereby allowing the outer container 100 of litter box 10 to transition into an opened state (e.g., as illustrated in FIG. 1) or into a closed state (e.g., as illustrated in FIGS. 5A and 5B).

In some embodiments, the outer container 100 is formed out of a single piece of material in which case the connection interface 105 can be a fold line, a bend line, or a perforation in the material. For example, the outer container 100 can be a foldable carton. In other embodiments, the top and bottom portions 130, 140 are separate and are pivotably and/or rotatably attached to each other, such as by a mechanical bearing such as a hinge. In these embodiments, the top portion 130 can be formed out of a first material and the bottom portion 140 can be formed out of a second material, which can be the same as or different than the first material.

The outer container 100, including the top and/or bottom portions 130, 140 (in general, outer container 100), can be formed out of cardboard, wood, metal (e.g., aluminum and/or stainless steel), plastic (e.g., corrugated plastic), and/or another material. In some embodiments, the outer container 100 can be formed out of a waterproof material (e.g., a hydrophobic material such as plastic or a coated metal) and/or a water-resistant material. In addition, or in the alternative, the outer container 100 can be formed out of a first material that has a waterproof and/or a water-resistant coating. The waterproof coating and/or the water-resistant coating can include wax (e.g., a paraffin wax), a polyethylene film or lamination, a biodegradable coating (e.g., CORRUCOTE™ available from LiquiGuard Technologies Inc.), and/or another coating. In some embodiments, the outer container 100 can include a first material disposed on a second material, where one or both of the first and/or second materials is/are waterproof or water-resistant. For example, the outer container 100 can include a plastic material (a waterproof and/or water-resistant material) disposed (e.g., coated or laminated) on cardboard.

Figure 2:
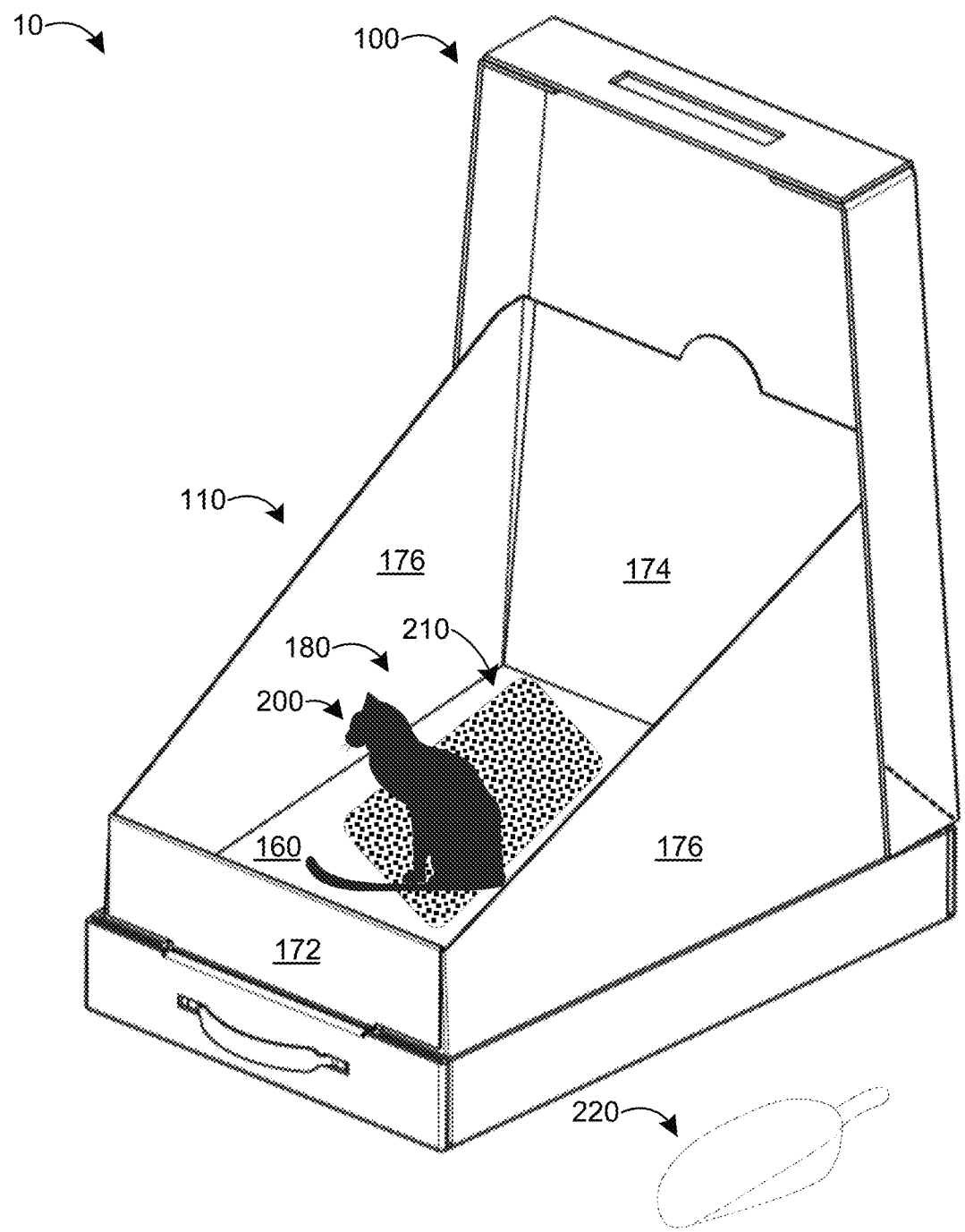
FIG. 2 is another perspective view of the litter box illustrated in FIG. 1 according to one or more embodiments.
Figure 6:
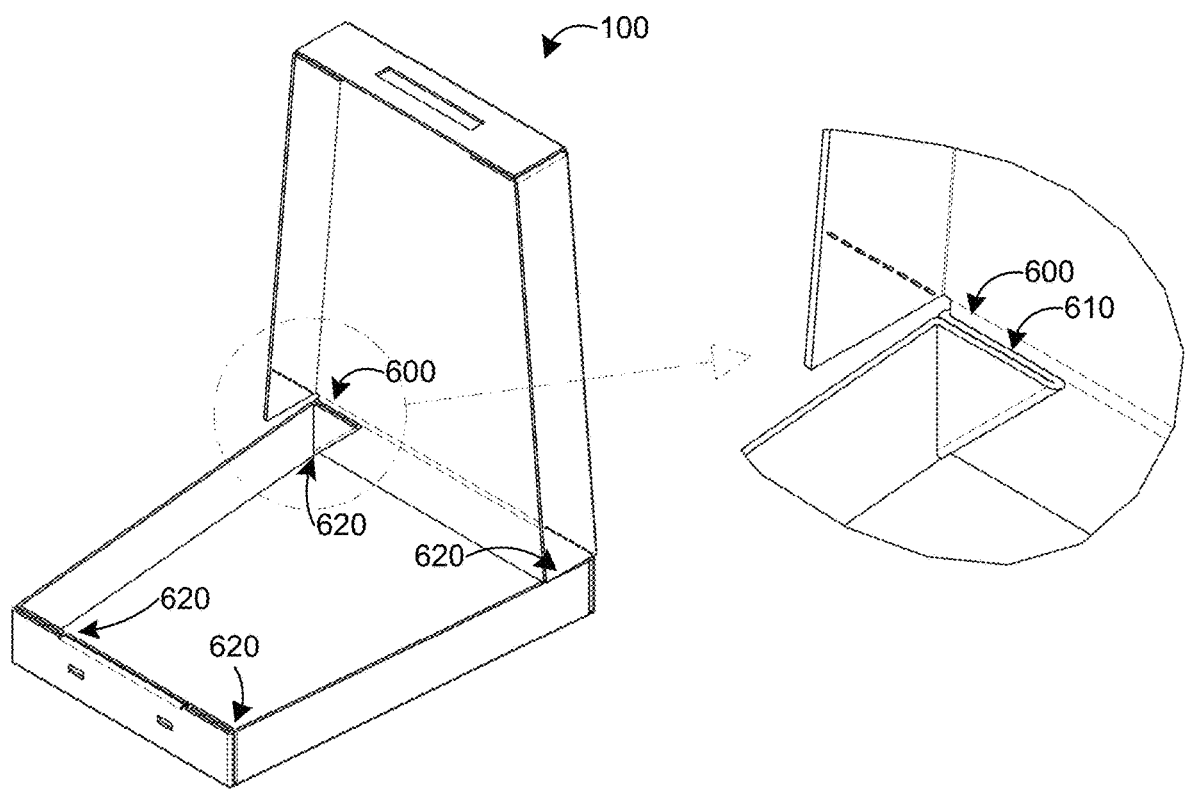
FIG. 6 illustrates an example of a double-folded corner in the outer container according to one or more embodiments.
Figure 7:
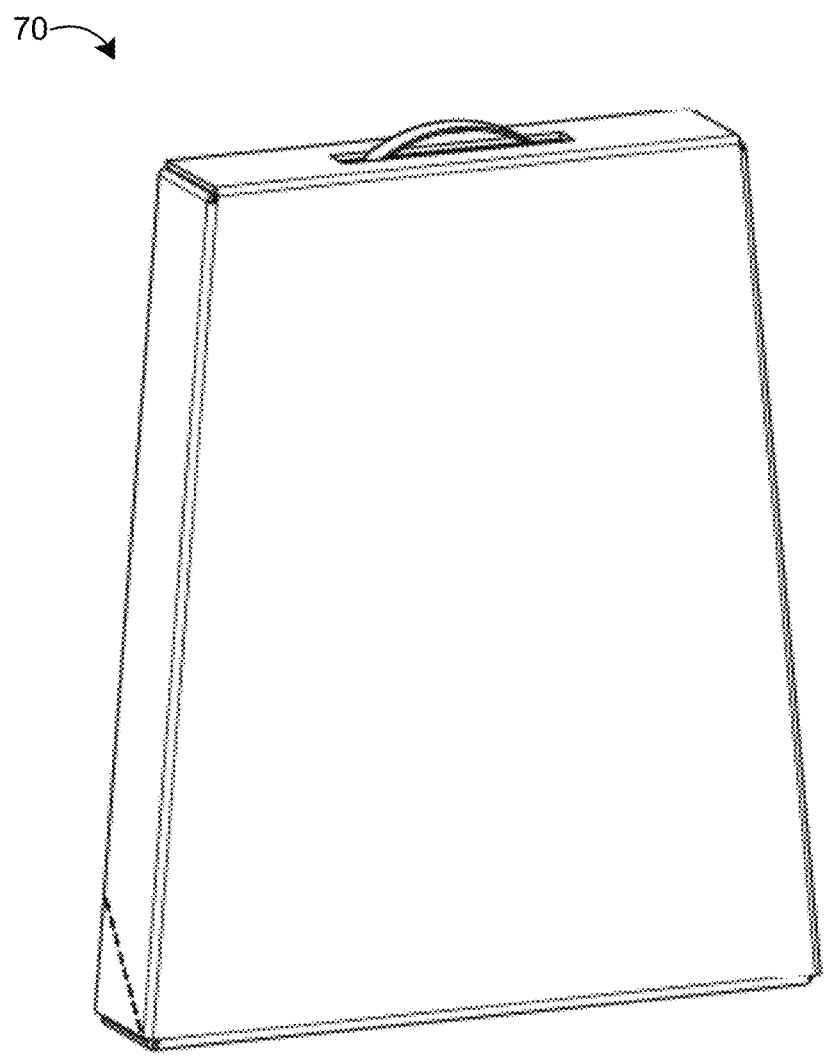
FIG. 7 is a perspective view of a litter box in a closed state according to one or more embodiments.
Figure 8:
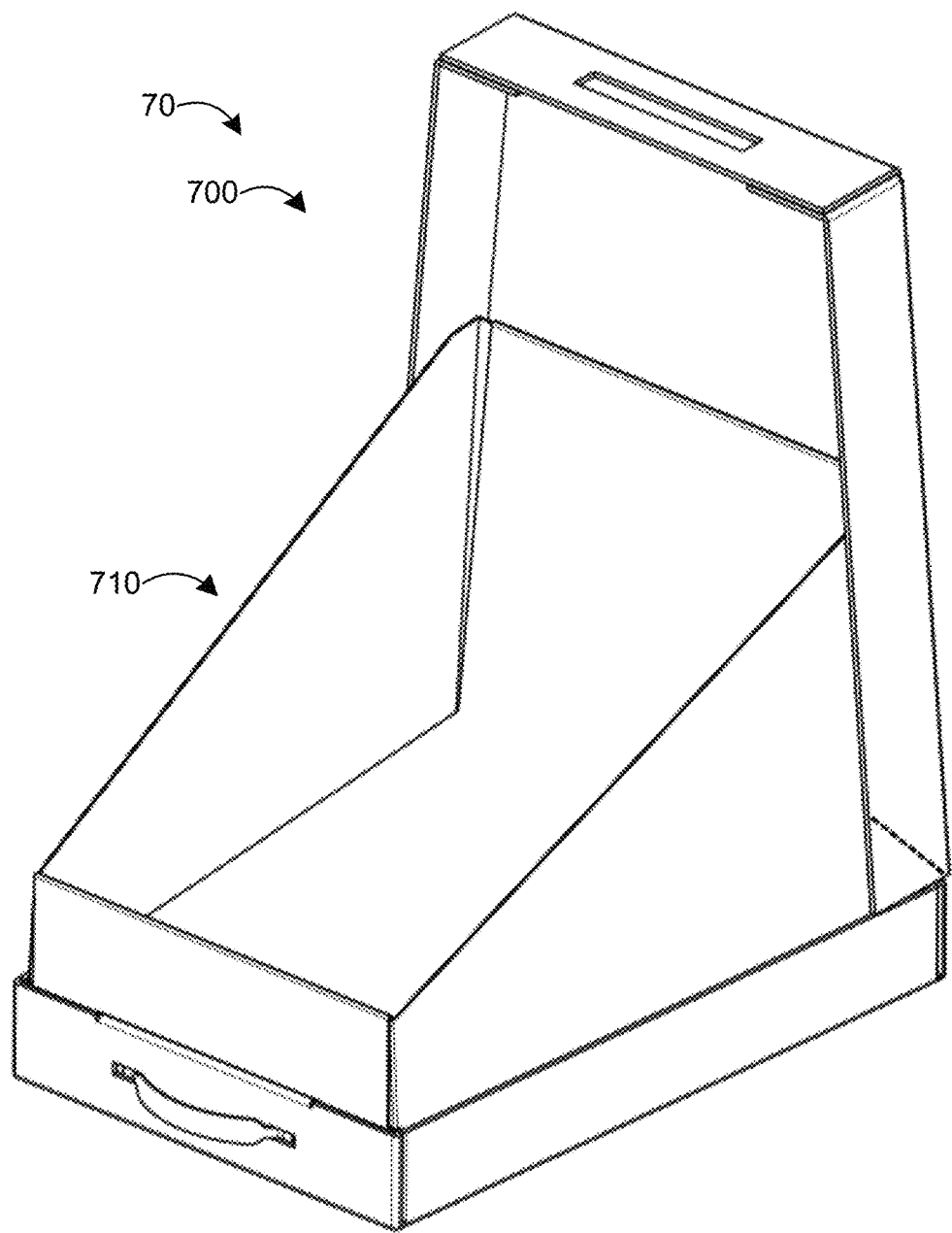
FIG. 8 is a perspective view of the litter box illustrated in FIG. 7 in an opened state according to one or more embodiments.

The inner container 110 includes a base 160 and walls 170, including a front wall 172, a rear wall 174, and two opposing sidewalls 176. The base 160 has a planar or substantially planar exposed surface 162. The base 160 and walls 170 define an inner container volume 180 in which a cat 200 (or another pet) can enter to urinate and/or defecate in kitty litter 210 disposed on the base 160 of the inner container 110, as illustrated in FIG. 2. The inner container walls 170 (e.g., the sidewalls 176) are configured to capture and/or contain urine that the cat 200 may spray while using the litter box 10. This is advantageous over existing litter boxes where urine can be sprayed onto the adjacent floor or wall. In addition, the rear wall 174 prevents the cat from urinating and defecating over the back of the litter box 10. The inner container 110 can be formed out of any of the materials described herein with respect to outer container 110. For example, the inner container 110 can include or can be formed out of a waterproof or a water-resistant material. In addition, or in the alternative, the corners of the inner container 110 and/or of the outer container 100 can be double-folded to retain water (e.g., so they are waterproof and/or water resistant). For example, FIG. 6 illustrates the outer container 100 having double-folded corners 600. Each double-folded corner 600 is folded along a line or perforation 610. The double-folded corners 600 can improve the seal at the corners 620 of the bottom portion 140 of the outer container 100. Some or all of the corners 620 can comprise a double-folded corner 600.

The litter box 10 can be disposable and/or can be formed of biodegradable materials. For example, the litter box 10 can be formed out of paper (e.g., cardboard), plastic, metal, or another material. Some or all of the materials can be waterproof or water-resistant, or they can include a waterproof or a water-resistant coating or treatment. For example, carboard can include a waterproof or a water-resistant coating such as a wax (e.g., a paraffin wax), epoxy, plastic (e.g., polyethylene), or another material. In some embodiments, the outer container 100 and the inner container 110 are formed out of a single piece of material, such as a material that includes one or more of the materials described herein.

In some embodiments, the litter box 10 can be shipped or sold as a kit with a container or package of kitty litter 210 and/or with a scoop 220. In one example, the litter box 10 can be shipped or sold as a kit with kitty litter 210 disposed in a container or pan that includes a removable cover, film, and/or seal. The litter box 10 can be shipped or sold with the container or pan of kitty litter 210 disposed in the inner container 110 or the container or pan of kitty litter 210 can be disposed outside of the litter box 10 (e.g., in the shipping or retail box). To install, the customer can open or unfold the litter box 10 and remove the cover, film, and/or seal to expose the kitty litter 210, which can optionally be poured onto the base 160 of the inner container 110. If the container or pan of kitty litter 210 is disposed outside of the litter box 10, the customer can place the opened container or pan of kitty litter 210 in the inner container 110 (e.g., on base 160) of the litter box 10, or the customer can pour the kitty litter 210 onto the base 160 of the inner container 110. In another example, the litter box 10 can be shipped or sold with a package of kitty litter 210 that includes a sufficient volume or weight to fill the inner container 110 of the litter box 10. To install, the customer can open or unfold the litter box 10 and then pour the package of kitty litter 210 into the inner container 110 of the litter box 10. The package of kitty litter 210 can be poured directly onto the base 160 of the inner container 110 or it can be poured into a container or pan, which is then placed on base 160.

Figure 3:
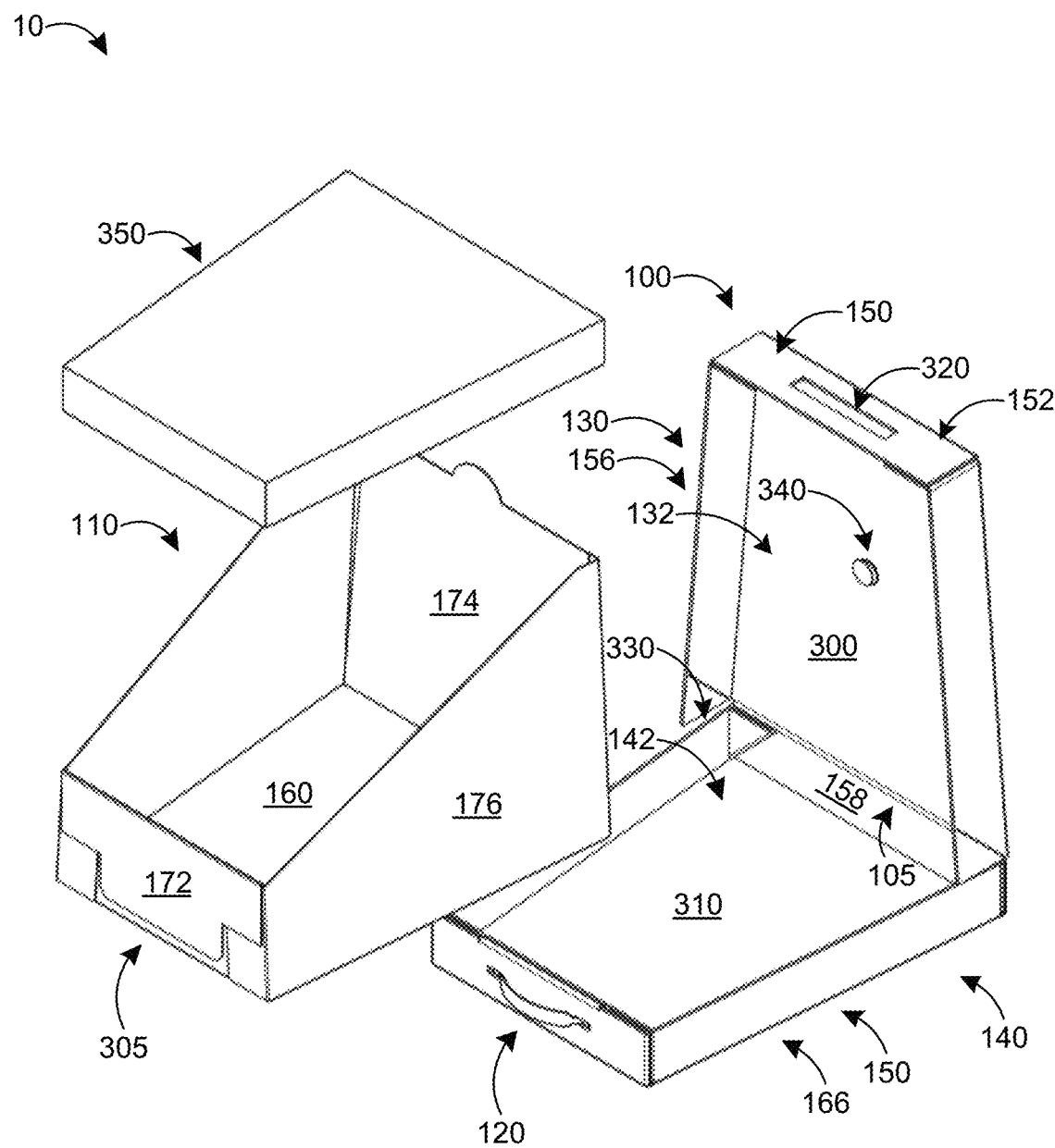
FIG. 3 is an exploded view of the litter box illustrated in FIG. 1 according to one or more embodiments.

FIG. 3 is an exploded view of litter box 10. The top portion 130 includes a base 300 and walls 150 that define an interior volume 132. The walls 150 of the top portion 130 include a front wall 152, sidewalls 156, and a back wall 158. The front wall 152 includes a slot 320 to receive the handle 120 when the litter box 10 is in a stowed state (e.g., as illustrated in FIGS. 5A and 5B). A gap 330 is disposed between the lower end of the sidewalls 156 of the top portion 130 and the upper end of the sidewalls 166 of the bottom portion 140, which allows the top portion 130 to rotate with respect to the bottom portion 140. The base 300 includes a hole or recess 340 that is sized and arranged to receive a projection 440 (illustrated in FIG. 4) on the back side of rear wall 174 of inner container 110. The hole or recess 340 and the projection 440 engage each other to secure the rear wall 174 when it unfolds to the vertical orientation illustrated in FIGS. 1 and 2. It is noted that the locations of the hole or recess 340 and projection 440 can be switched. For example, in other embodiments the rear wall 174 can include a hole or recess and the base 300 can include a projection, which can be the same as or similar to projection 440. In other embodiments, the hole or recess 340 and projection 440 can be omitted and the rear wall 174 of inner container 110 can be secured or attached to the base 300 with glue, tape, hook-and-loop fasteners, or another attachment mechanism.

The bottom portion 140 includes a base 310 and corresponding walls 150 (i.e., front, rear, and side walls) that define an interior volume 142.

The walls 172, 174, and 176 of the inner container 110 are pivotably, rotatably, and/or foldably attached to the base 160 by respective connection interfaces 305. Each connection interface 305 can be the same as or substantially the same as connection interface 105. The connection interface 305 for one of the walls 172, 174, and 176 can be the same or different that the connection interface for another of the walls 172, 174, and 176. Each wall 172, 174, and 176 can fold, rotate, and/or pivot inwardly towards the base 160. An optional cover 350 can fit on the inner container 110 to temporarily cover it, for example during transit.

Figure 4:
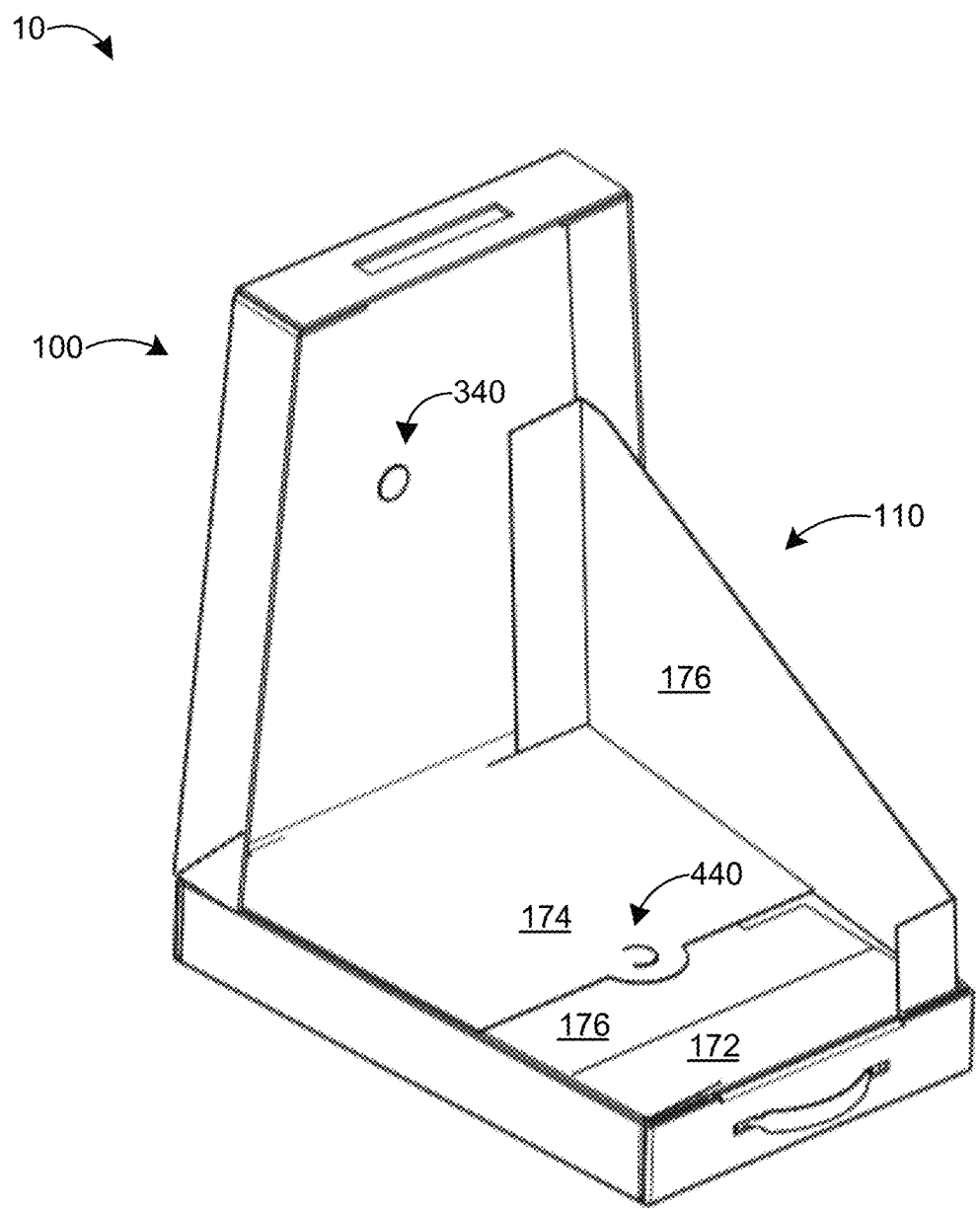
FIG. 4 is a perspective view of the litter box illustrated in FIG. 1 in which the inner container is partially in a closed state according to one or more embodiments.

FIG. 4 is a perspective view of litter box 10 in which the inner container 110 is partially in a closed state. FIG. 4 illustrates how the walls 172, 174, and 176 of the inner container 110 fold inwardly towards the base 160. When the second sidewall 176 is folded down, the inner container is in a stowed or folded state. In this state, the outer container 100 can be closed for storage and/or for portability by picking up the litter box 10 using handle 120 (e.g., like a suitcase), as illustrated in FIGS. 5A and 5B.

Figure 9:
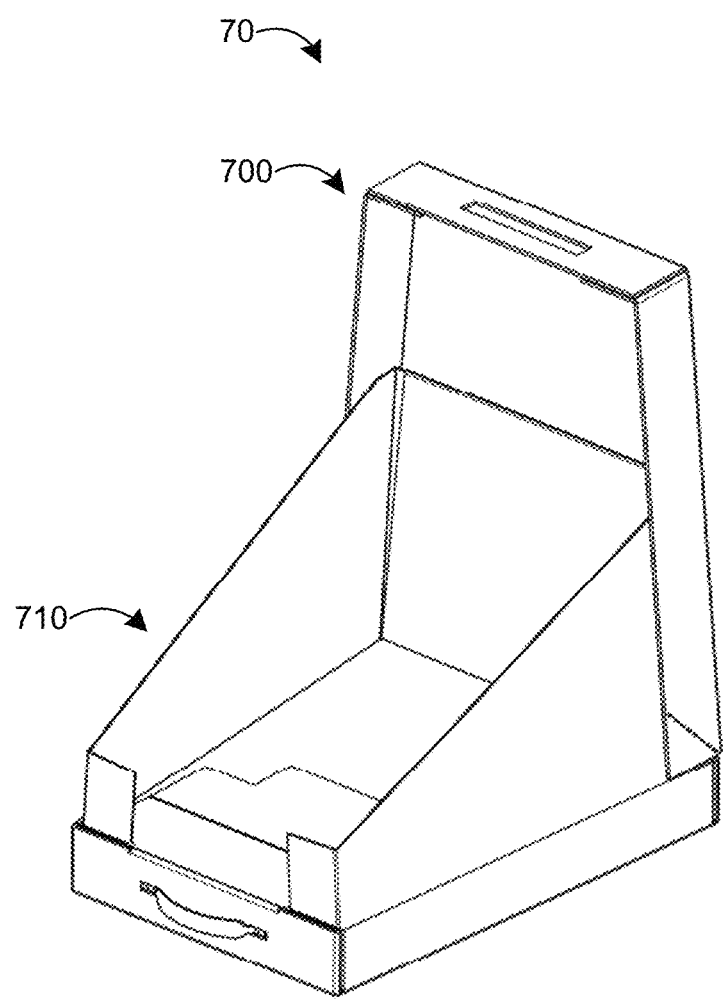
FIG. 9 is a perspective view of the litter box illustrated in FIG. 7 in a first step to transition the litter box from an opened state to a closed state.
Figure 10:
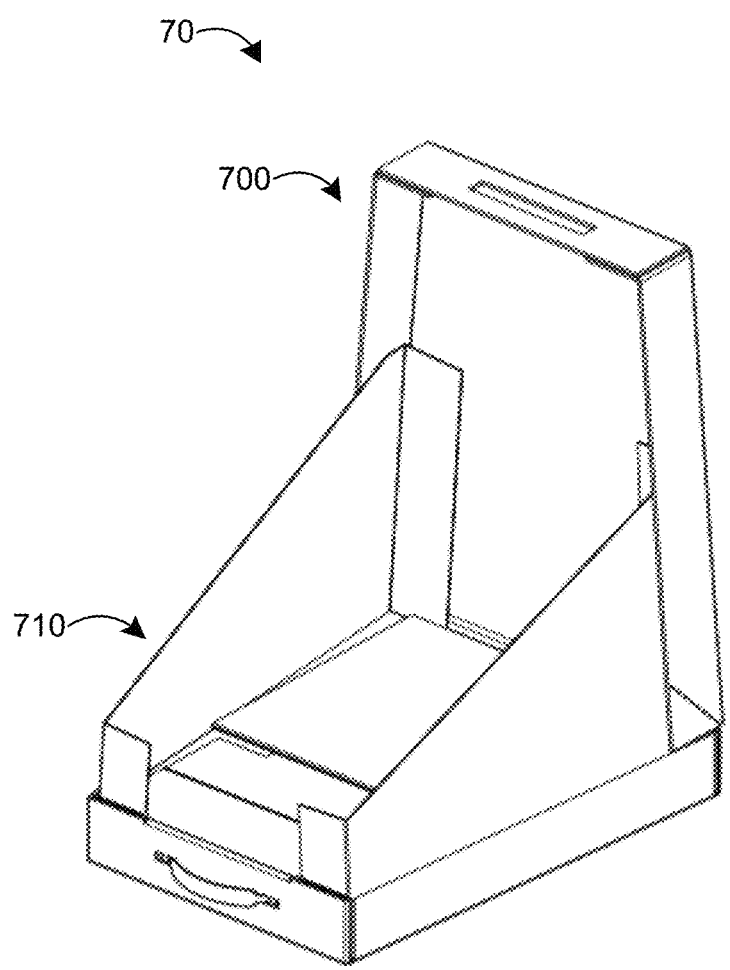
FIG. 10 is a perspective view of the litter box illustrated in FIG. 7 in first and second steps to transition the litter box from an opened state to a closed state.
Figure 11:
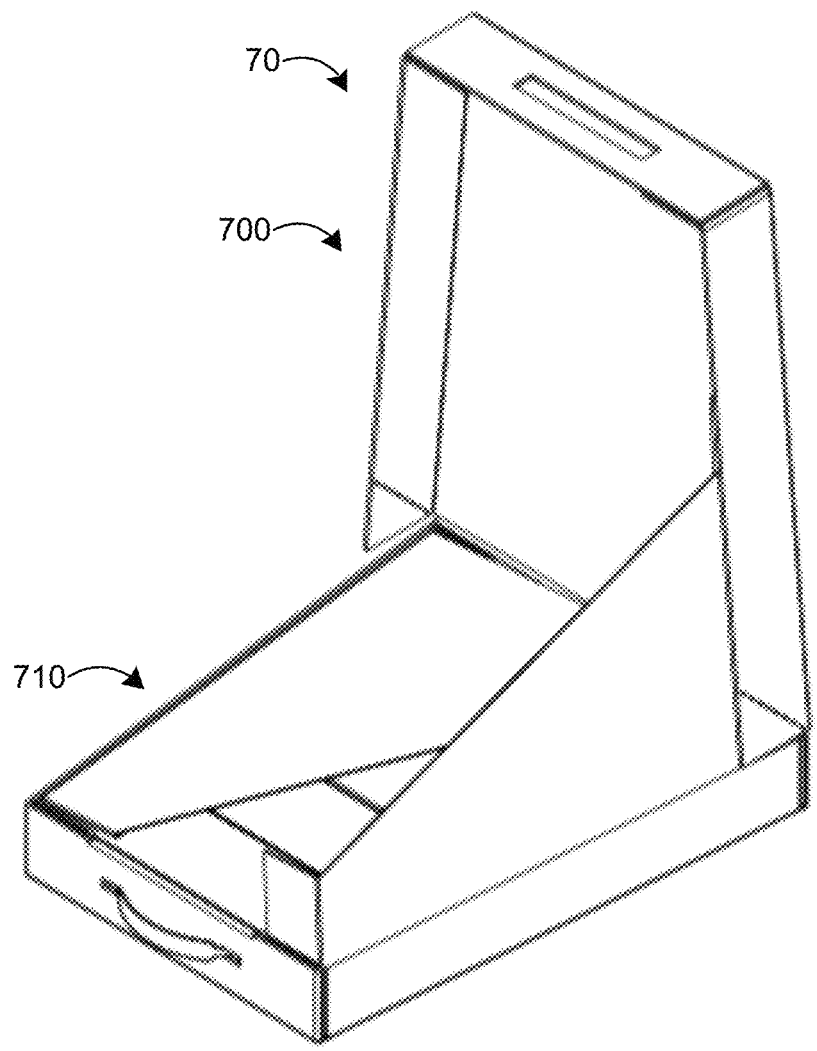
FIG. 11 is a perspective view of the litter box illustrated in FIG. 7 in a fourth step to transition the litter box from an opened state to a closed state.
Figure 12:
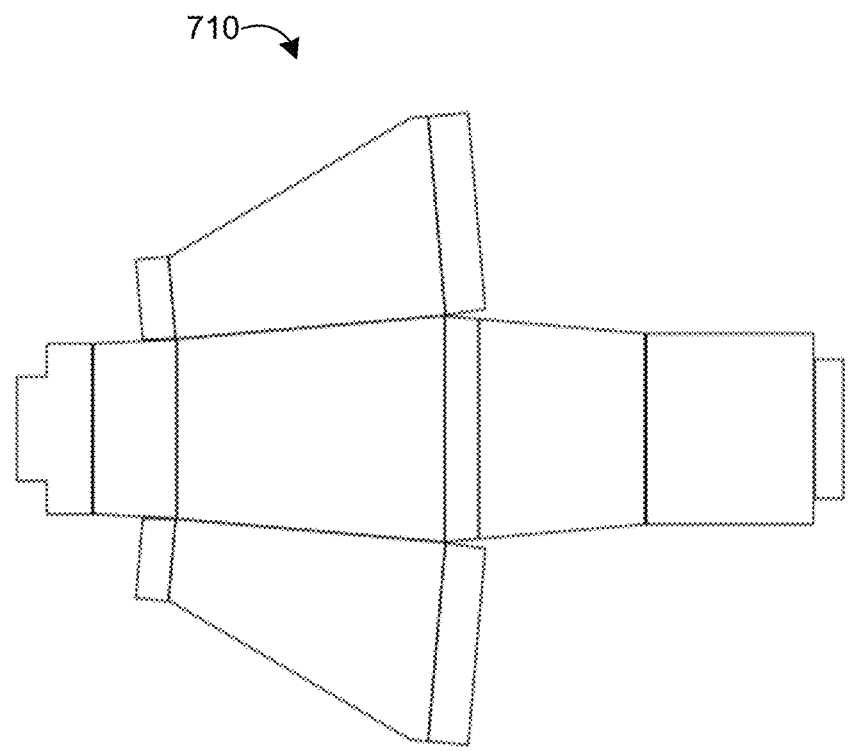
FIG. 12 is a top view of the inner container of the litter box illustrated in FIG. 7 in an unfolded state.
Figure 13:
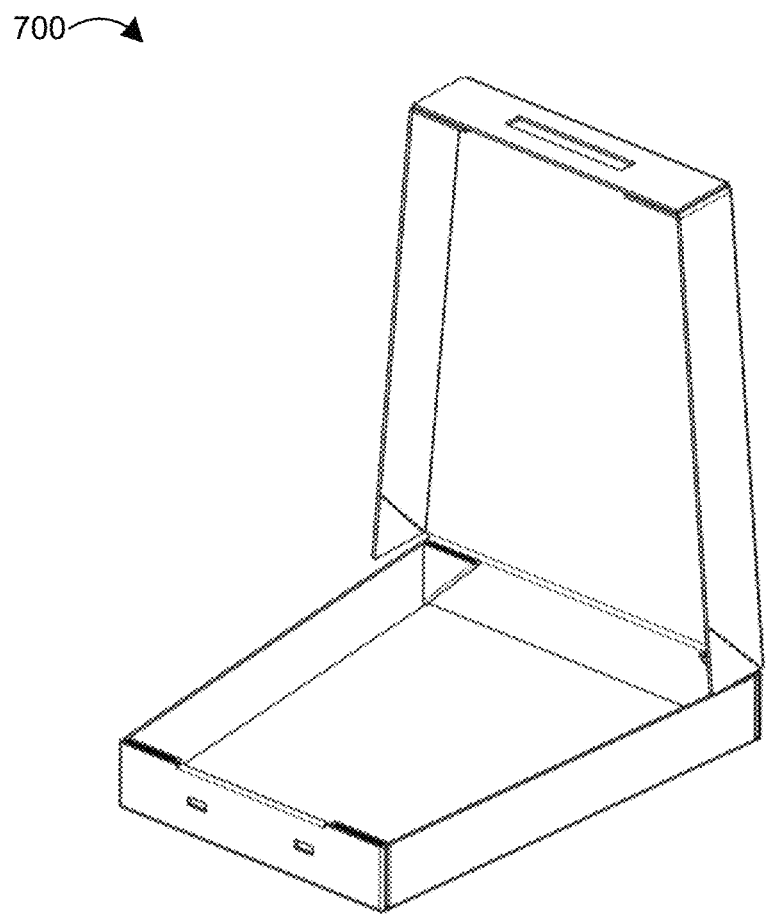
FIG. 13 is a perspective view of the outer container litter box illustrated in FIG. 7 in an opened state.

FIGS. 7-15A-B illustrate a litter box 70 including outer container 700 and inner container 710, according to one or more embodiments. Litter box 70, outer container 700, and/or inner container 710 can be the same as, substantially the same as, or different than litter box 10, outer container 100, and inner container 110, respectively. FIGS. 9-11 illustrate steps to fold down the inner container 710, for example to ship, transport, or throw away the litter box 70 after its use (e.g. after the kitty litter has expired).

Figure 14A:
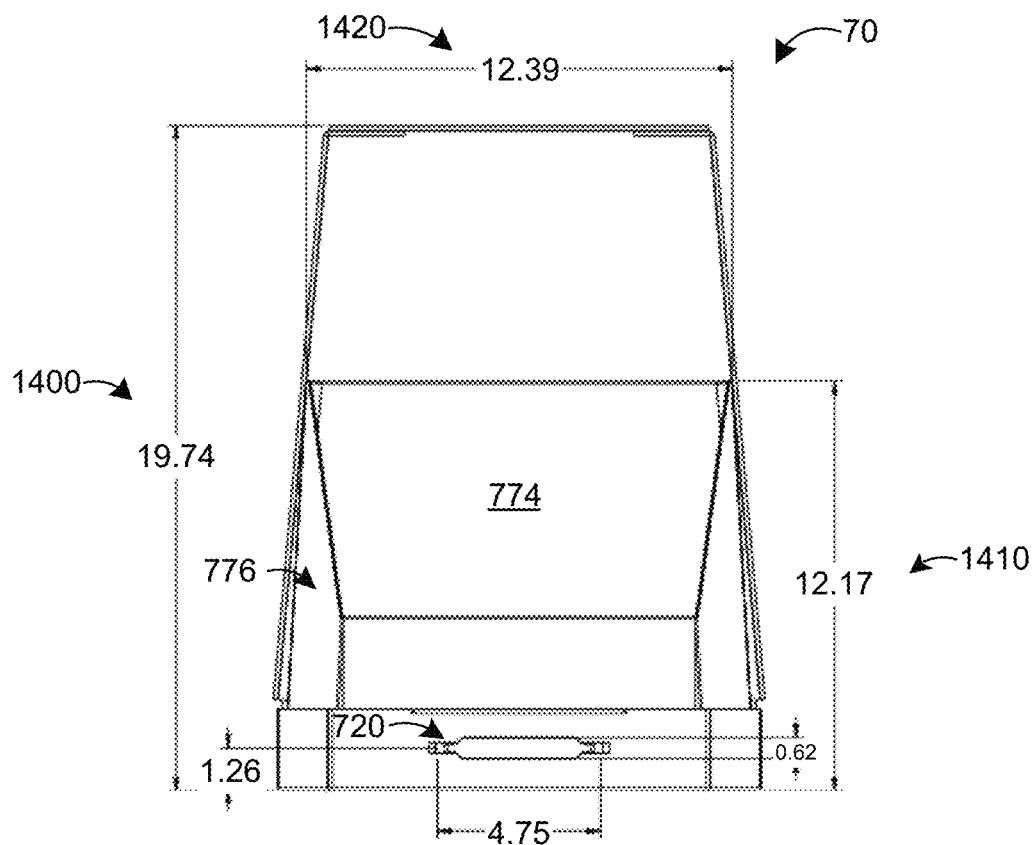
FIGS. 14A and 14B are rear and side views, respectively, of the litter box illustrated in FIG. 7 in an opened state to illustrate example dimensions.
Figure 14B:
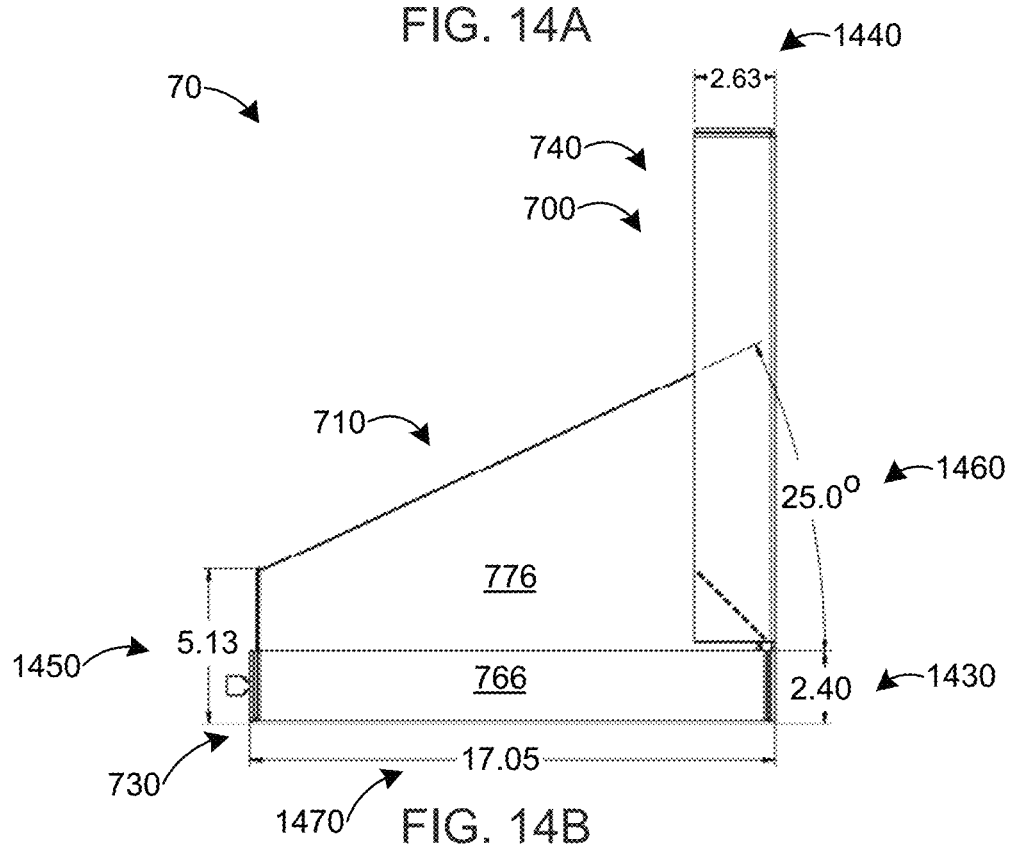
Figure 16:
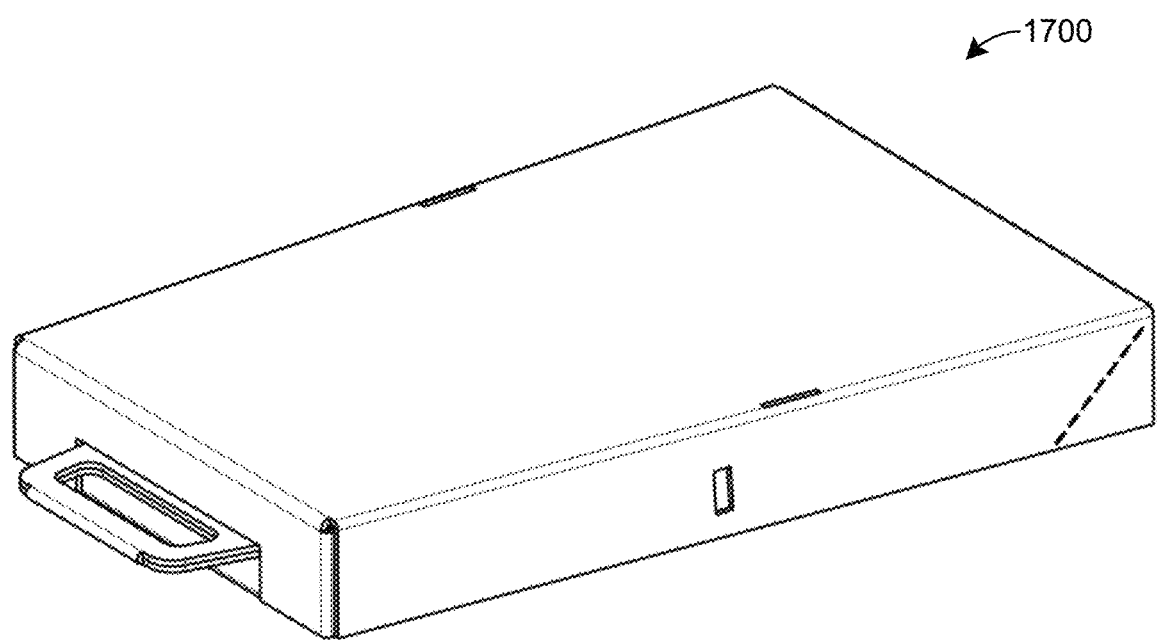
FIG. 16 is a perspective view of a litter box according to one or more embodiments.

FIGS. 14A-B and 15A-B illustrate representative dimensions of the litter box 70. Of course, other dimensions are possible to achieve the same or similar functionality. FIG. 14A. Illustrates that the top portion 740 of the outer container 700 can extend to a height 1400 of about 19.74 inches (e.g., about 17 inches to about 21 inches), with respect to a planar surface on which the litter box 70 is disposed, in the opened state. In addition, the maximum height 1410 of the sidewalls 776 of the inner container 710 can be about 12.17 inches (e.g., about 10 inches to about 14 inches), with respect to a planar surface on which the litter box 70 is disposed, in the opened state. The maximum width 1420 of the rear wall 774 can be about 12.39 inches (e.g., about 10 inches to about 14 inches). Example dimensions of the handle 720 are also illustrated. FIG. 14B illustrates that the walls of the bottom portion 730 of the outer container 700 have a height 1430 of about 2.40 inches (e.g., about 2 inches to about 3 inches), and that the walls of the top portion 740 of the outer container 700 have a height or width 1440 of about 2.63 inches (e.g., about 2 inches to about 3 inches). The minimum height 1450 of the sidewalls 776 of the inner container 710 can be about 5.13 inches (e.g., about 2 inches to about 8 inches), with respect to a planar surface on which the litter box 70 is disposed, in the opened state. The sidewalls 776 of the inner container 710 linearly increase in height from the minimum height 1450 to the maximum height 1410, forming an angle 1460 of about 25° (e.g., about 20° to about) 40° with respect to the length 1470 of the sidewall 766 of the bottom portion 710 of the outer container 700. In other embodiments, the height of the sidewalls 776 of the inner container 710 increase non-linearly from the minimum height 1450 to the maximum height 1410.

FIG. 15A illustrates that the outer container 700 expands from a minimum width 1500 of about 11.32 inches (e.g., about 9 inches to about 13 inches) to a maximum width 1510 of about 14.31 inches (e.g., about 12 inches to about 16 inches). The difference between the minimum and maximum widths 1500, 1510 can be about 3 inches (e.g., about 2.5 inches to about 3.5 inches) to about 7 inches. The length 1520 of the outer container 700 can be about 17.33 inches (e.g., about 14 inches to about 20 inches). The width or height 1530 of the outer container 700 can be about 2.66 inches (e.g., about 2 inches to about 3 inches). The outer container 700 can have a generally trapezoidal shape with each side having an angle 1540 of about 85° (e.g., about 80° to about 90°) with respect to parallel top and bottom surfaces.

Litter box 70 can include some or all of the features described herein.

Figure 17:
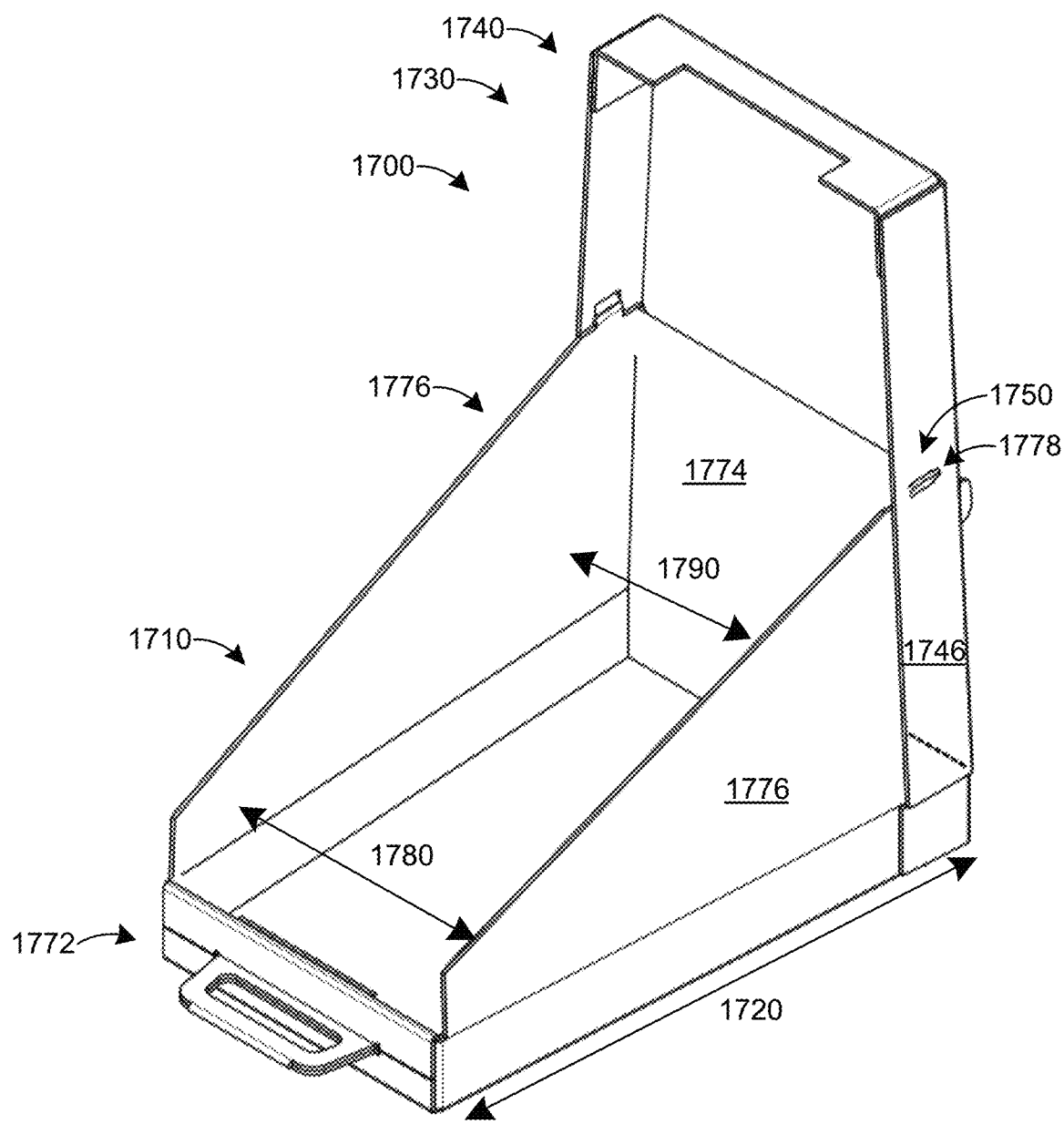
FIGS. 17 and 18 are perspective views of the litter box illustrated in FIG. 17 in an opened state.
Figure 18:
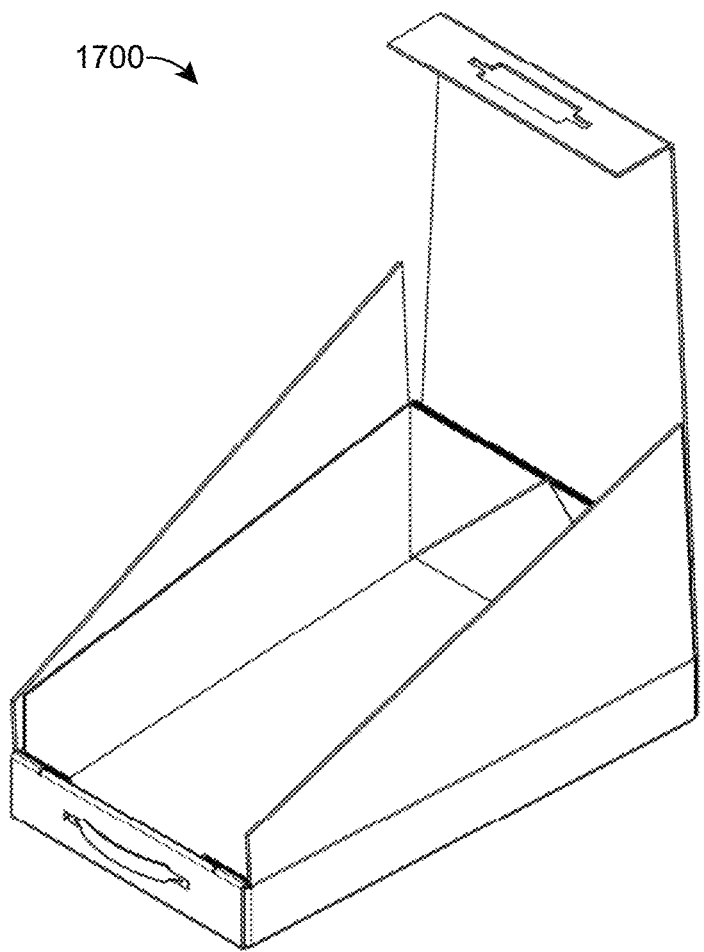
Figure 19A:
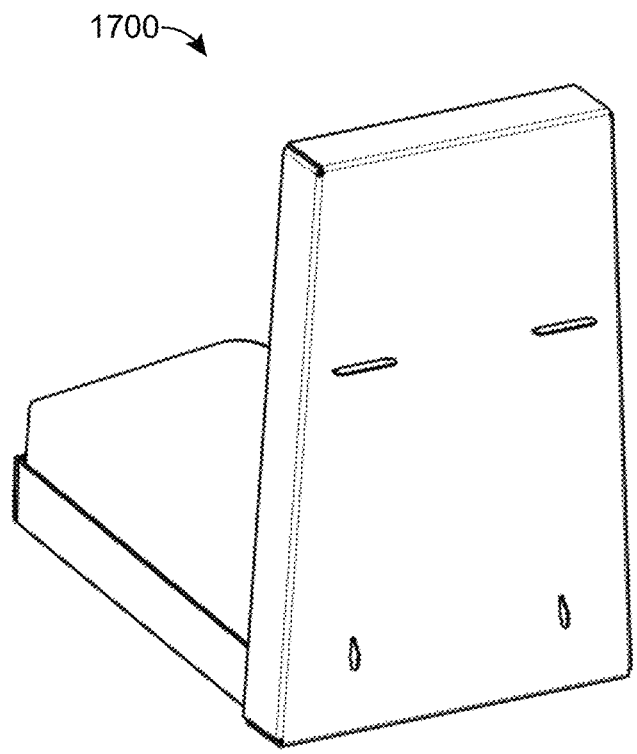
FIGS. 19A and 19B are rear and front perspective views, respectively, of the litter box illustrated in FIG. 17 in an opened state.
Figure 19B:
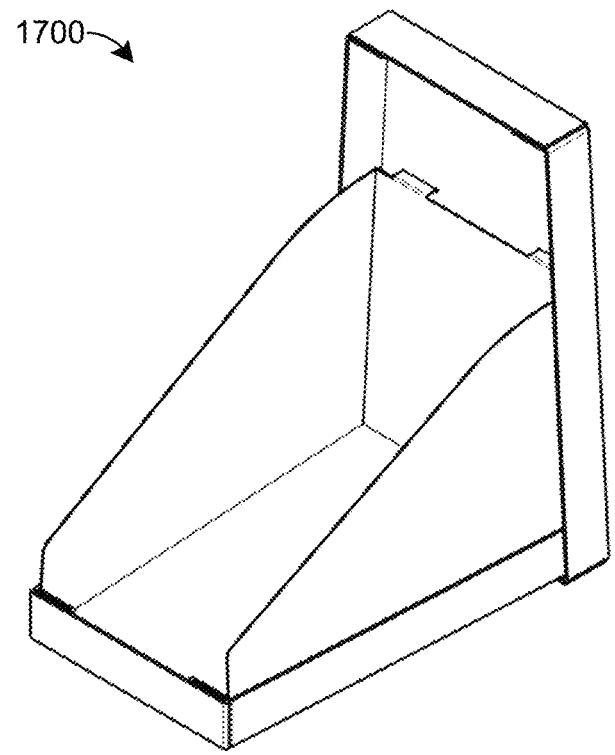

FIGS. 16-20 illustrate a litter box 1700 according to one or more embodiments. Litter box 1700 can include some or all of the features described herein. FIG. 17 illustrates that the distance between opposing sidewalls 1776 increases from the front (e.g., proximal to front wall 1772) to the rear of the inner container 1710 (e.g., proximal to rear wall 1774). In one example, the distance between opposing sidewalls 1776 increases by about 1 to about 4 inches, including about 2 inches, and about 3 inches, from the front to the rear of the inner container 1710. In a specific example, the distance 1780 between the sidewalls 1776 is about 10-15 inches, including about 11 inches, about 12 inches, about 13 inches, and about 14 inches, proximal to front wall 1772 and the distance 1790 between the sidewalls 1776 is about 11 inches to about 19 inches, including about 12 inches, about 13 inches, about 14 inches, about 15 inches, about 16 inches, about 17 inches, and about 18 inches, proximal to rear wall 1774. For example, the distance 1780 between the sidewalls 1776 can be about 12 inches proximal to front wall 1772 and the distance 1790 between the sidewalls 1776 can be about 14 inches proximal to rear wall 1774. As used herein, "about" means plus or minus 10% of the relevant value.

FIG. 17 also illustrates the distance or length 1720 from the front to the rear of the inner container 1710. The length 1720 can be about 16 inches to about 22 inches in some embodiments. For example, the length 1720 can be about 17 inches, about 18 inches, about 19 inches, about 20 inches, about 21 inches, or any value or range between any two of the foregoing lengths. In other embodiments, the length 1720 is less than about 16 inches or greater than about 22 inches. Additional and/or alternative example dimensions are illustrated in FIGS. 14A-B and 15A-B.

In addition, FIG. 17 illustrates that the sidewalls 1776 include an optional tab 1778 disposed in an optional aperture 1750 defined in the sidewall 1746 of the top portion 1740 of the outer container 1730. The tab 1778 can secure the sidewalls 1776 to the outer container 1730 to maintain the litter box 1700 in the opened position. In some embodiments, the tabs 1778 can be replaced with zip ties.

Figure 20:
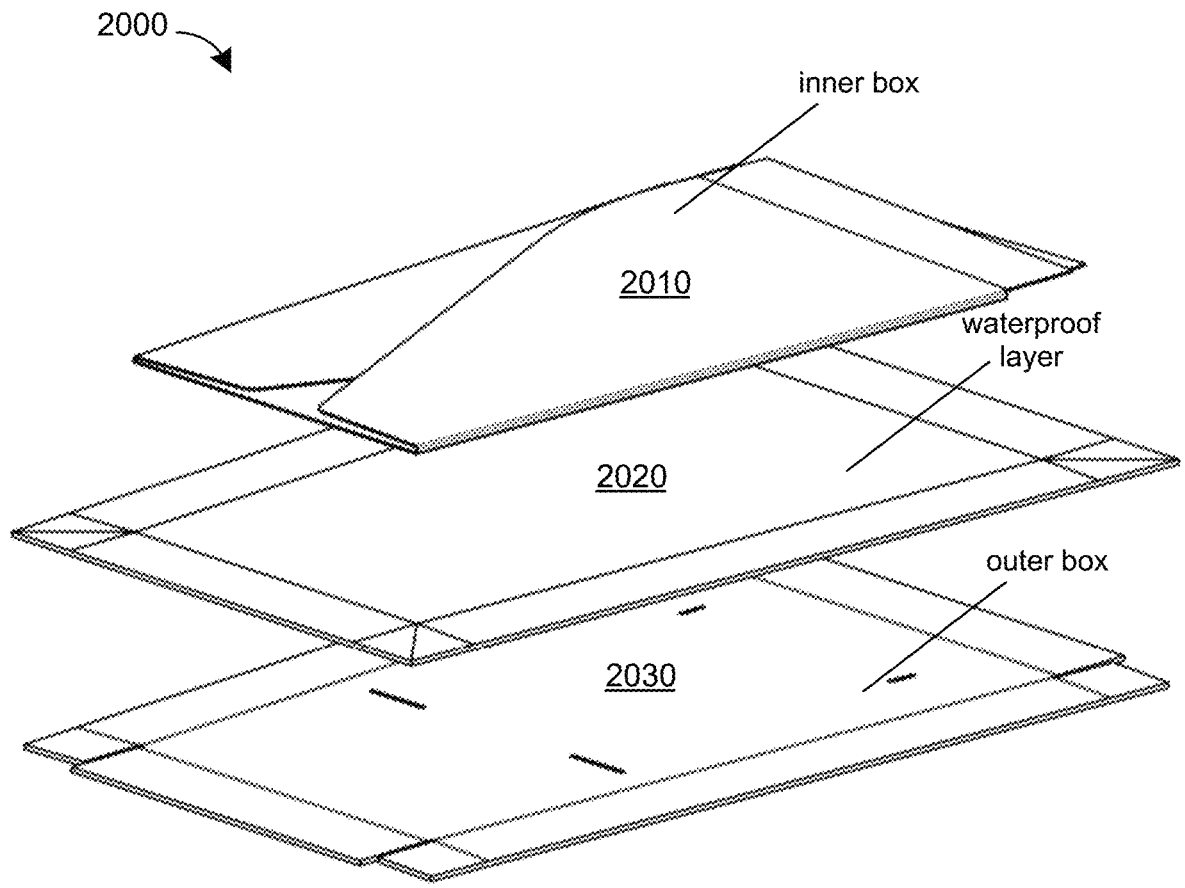
FIG. 20 illustrates an example of the materials 2000 that comprise the litter box illustrated in FIG. 17.

FIG. 20 illustrates an example of the materials 2000 that comprise litter box 1700. The materials include an inner box material 2010, a waterproof layer 2020, and an outer box material 2020. The waterproof layer 2020 is disposed between the inner box material 2010 and the outer box material 2030, which can prevent liquids (e.g., urine) from leaking out of the litter box. For example, waterproof layer 2020 can prevent liquids from contacting the outer box material 2030 after passing through the inner box material 2010, which can be formed out of a non-waterproof material such as cardboard. The waterproof layer 2020 can comprise a hydrophobic material (e.g., as described herein). In an alternative embodiment, the waterproof layer 2020 is disposed on the inner box material 2010, and the inner box material is disposed on the outer box material 2030.

FIGS. 21-24 illustrate a litter box 2100 according to one or more embodiments. Litter box 2100 includes an outer container 2110, an optional insert 2120, and a handle 2130. The outer container 2110 includes a top portion 2140 and a bottom portion 2150 that are connected together at a connection interface 2105, which can be the same as connection interface 105. The top and bottom portions 2140, 2150 of the outer container 2110 can comprise top and bottom trays that can be pivotably attached to each other (e.g., using a mechanical bearing such as a hinge). Alternatively, the top and bottom portions 2140, 2150 can be integrally formed from a single piece of material, such as in a foldable carton, in which case the connection interface 2105 comprises a fold line in the foldable carton. The top portion 2140 includes a front wall 2142, a back wall 2144, and sidewalls 2146. Likewise, the bottom portion 2150 includes a front wall 2152, a back wall 2154, and sidewalls 2156. In some embodiments, the bottom portion 2150 does not include front wall 2152.

Figure 21:
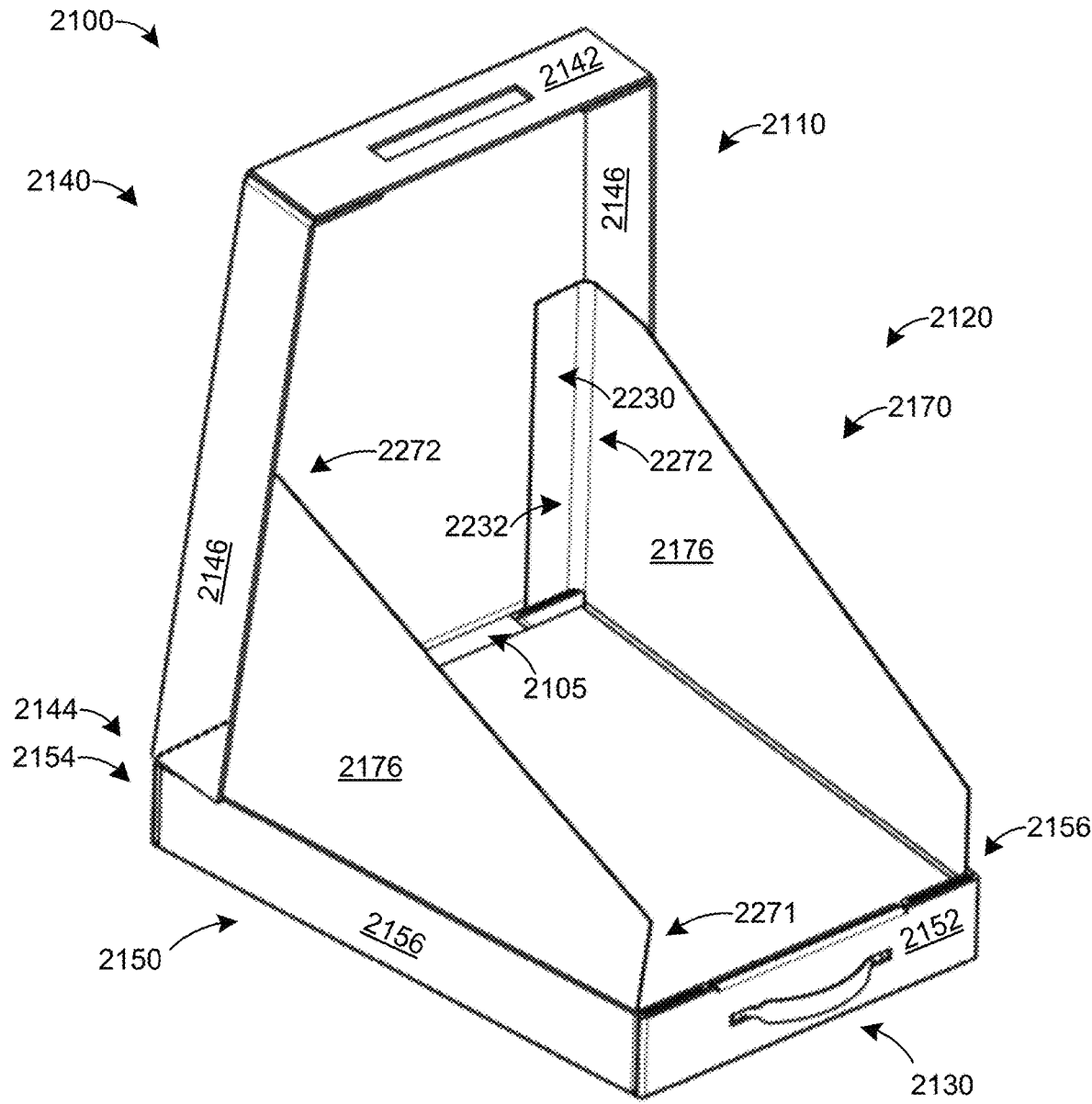
FIG. 21 is a perspective view of the litter box illustrated in FIG. 17 in an opened state.
Figure 22:
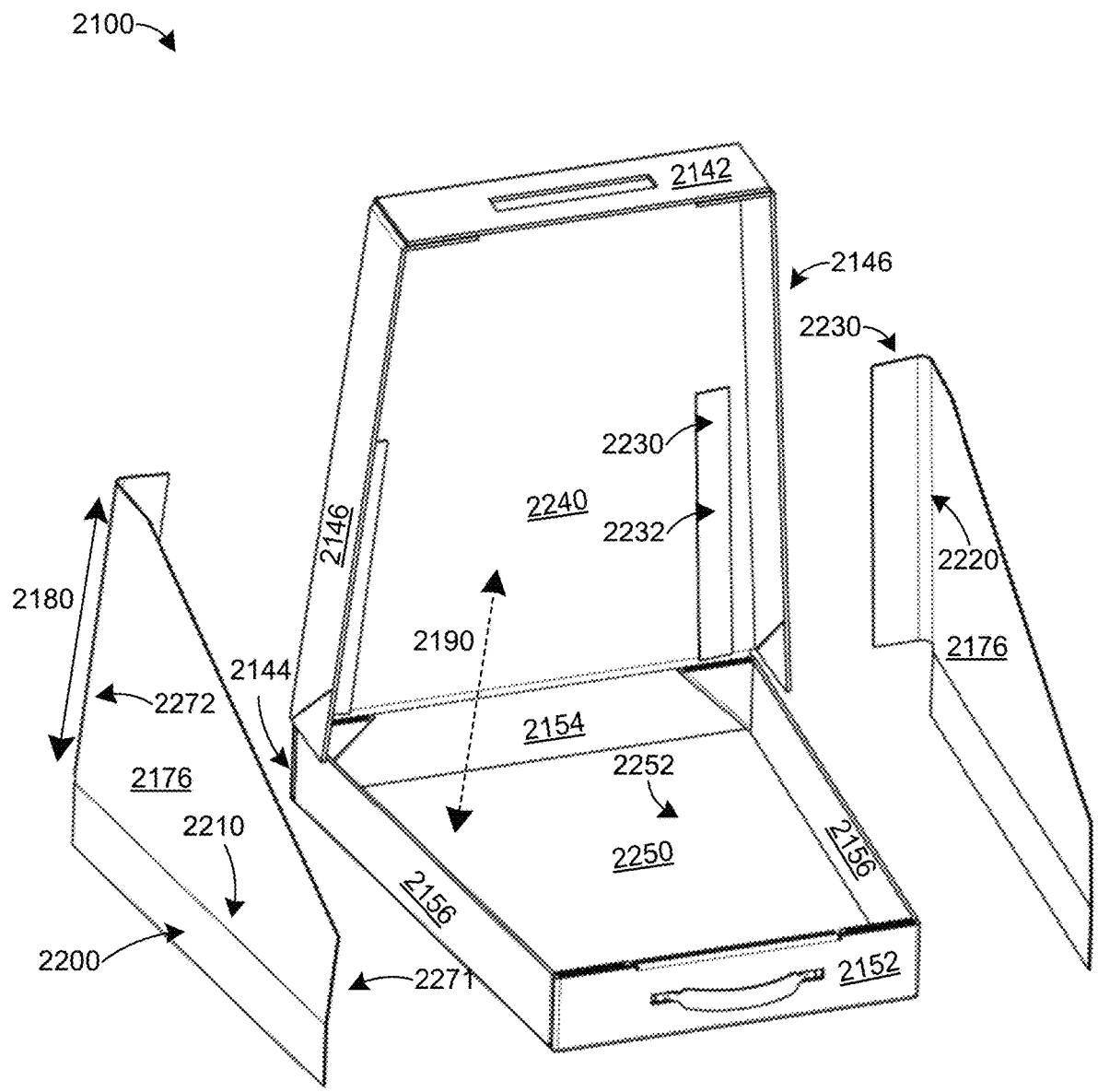
FIG. 22 is an exploded view of the litter box illustrated in FIG. 17 in an opened state.

Unlike the litter boxes described above (e.g., that include an inner container), litter box 2100 includes an optional insert 2170 having first and second insert sidewalls 2176. Each insert sidewall 2176 is attached to the outer container 2110 (e.g., to sidewall 2156 or to sidewall 2146) and can be folded, pivoted, and/or rotated inwardly or outwardly. In FIG. 21, the insert sidewalls 2176 are disposed in the outward or vertical orientation to place the litter box 2100 in an opened state. In the opened state, the sidewalls 2176 have a height 2180 that is determined with respect to an axis 2190 that is orthogonal to a plane of an inner exposed surface 2252 of the base 2250 of the bottom portion 2150 of the outer container 2110, as illustrated in FIG. 22. Alternatively, the sidewalls 2156 of the bottom portion 2150 (or alternatively the sidewalls 2146 of the top portion 2140) can comprise the optional insert 2170. For example, the sidewalls 2156 can be sized and arranged to form and/or include the insert sidewalls 2176.

The sidewall height 2180 increases from a first end 2271 of the sidewall 2176 proximal to the front wall 2152 of the bottom portion 2150 to a second end 2272 of the sidewall 2176 proximal to the back wall 2154 of the bottom portion 2150. In a specific example, the sidewall height 2180 at the first end 2271 is about 5.13 inches (e.g., about 3 inches to about 7 inches) and the sidewall height at the second end 2272 is about 12.17 inches (e.g., about 10 inches to about 14 inches), for example as illustrated in FIGS. 14A-B. Thus, the sidewall height 2180 at the second end 2272 can be about 1.5 times, about 2 times, about 2.5 times, about 3 times, about 3.5 times, about 4 times, or about 4.5 times the sidewall height 2180 at the first end 2271. In some embodiments, the increase in the sidewall height 2810 from the first end 2217 to the second end 2272 forms an angle, with respect to the sidewall 2156 of the bottom portion, of about 20° to about 40°, including about 25°, about 30°, or about 35°, for example as illustrated in FIG. 14B.

Figure 23:
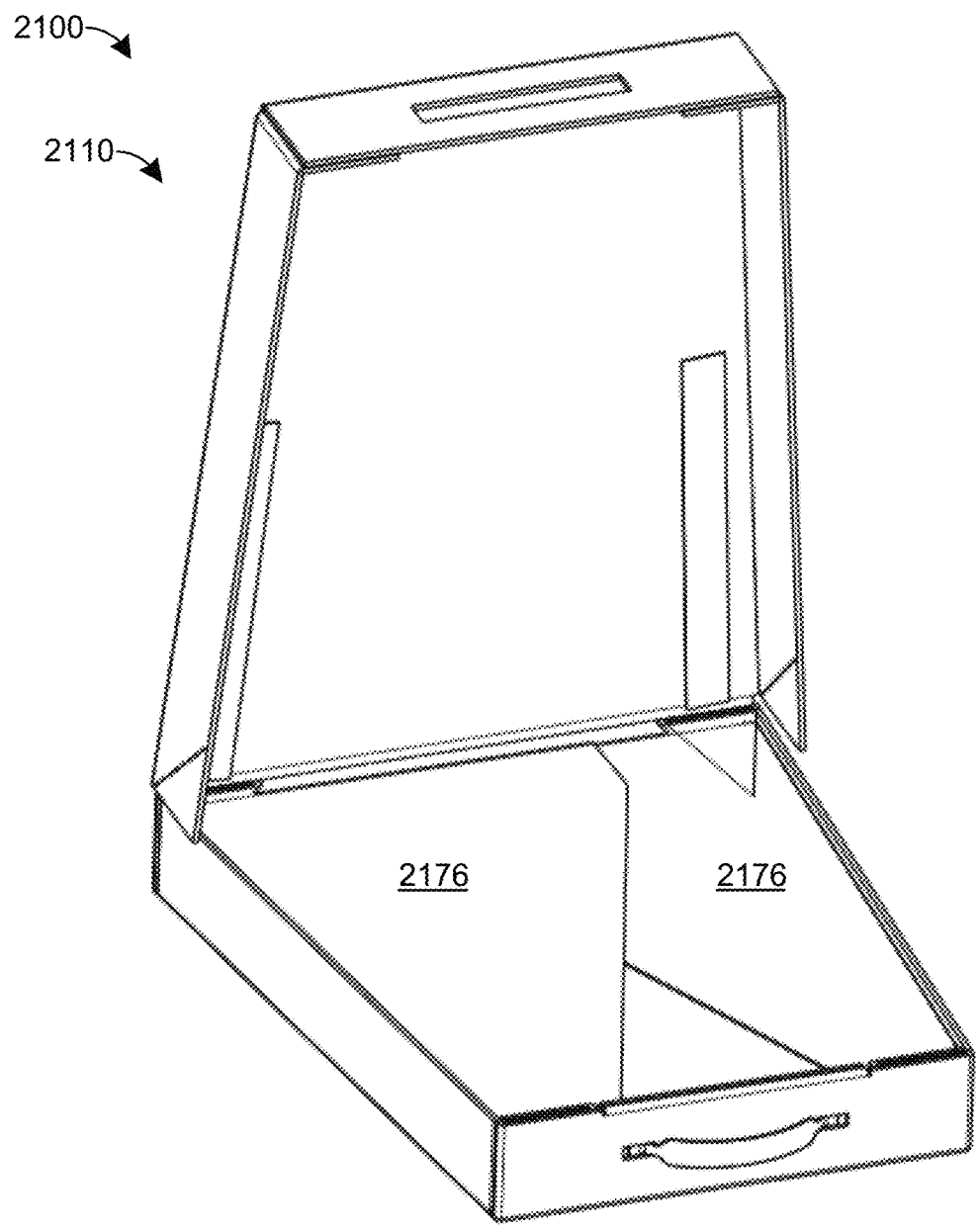
FIG. 23 is an exploded view of the litter box illustrated in FIG. 17 in a partially-closed state.
Figure 24:
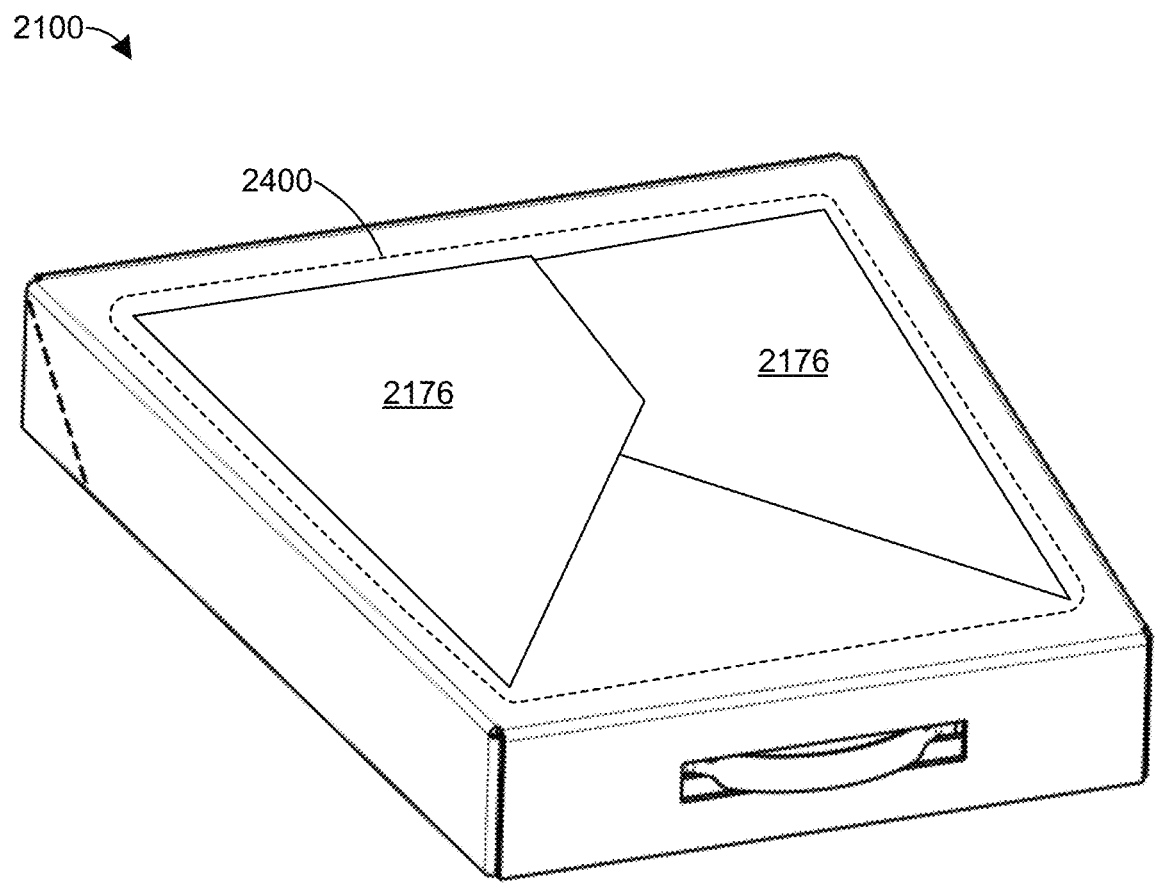
FIG. 24 is an exploded view of the litter box illustrated in FIG. 17 in a fully-closed state.

When the insert sidewalls 2176 are disposed in the inward or horizontal orientation, as illustrated in FIG. 23, the insert sidewalls 2176 are in a closed state. The outer container 2110 is then closed, as illustrated in FIG. 24, to place the litter box 2100 in the closed state where the insert sidewalls 2176 are disposed in a litter box cavity 2400 defined by the walls of the top and bottom portions 2140, 2150 of the outer container 2110, as illustrated in FIG. 24.

In some embodiments, each insert sidewall 2176 is attached to the bottom portion 2150 of the outer container 2110. In a specific example, each insert sidewall 2176 can include a first base insert sidewall portion 2200 that can be attached to a corresponding sidewall 2156 on the bottom portion 2150 of the outer container 2110 and the sidewalls 2176 can pivot inwardly or outwardly along a first fold line 2210, as illustrated in FIG. 22. The first base insert sidewall portion 2200 can be attached to the respective outer container sidewalls 2156 on the bottom portion 2150 with an adhesive (e.g., glue, tape, etc.), a staple, or another attachment mechanism. Alternatively, the first base insert sidewall portion 2200 can be attached to the base 2250 on the bottom portion 2150 of the outer container 2110. The second end 2272 of the insert sidewall 2176 can be attached or releasably attached to the top portion 2140 to secure the litter box 2100 in the opened state. For example, the insert sidewall 2176 can be releasably attached to the top portion 2140 with zip ties. In addition or in the alternative, the second end 2272 of the insert sidewall 2176 can rest on the base 2240 of the top portion to secure the litter box 2100 in the opened state. In addition or in the alternative, the second end 2272 of the insert sidewall 2176 can include one or more tabs that engage with corresponding apertures in the base 2240 or sidewalls 2146 of the top portion 2140 to secure the litter box 2100 in the opened state. In addition or in the alternative, the second end 2272 of the insert sidewall 2176 can be secured (e.g., releasably secured) to the base 2240 of the top portion 2140 with an adhesive (e.g., glue, tape, etc.) 2232.

Each fold line 2210 can be disposed at approximately the same height, or a slightly greater (e.g., about 1% to about 5% greater) height than the height of the corresponding outer container sidewall 2156. The fold line 2210 allows the insert sidewall 2176 to pivot inwardly to dispose the insert sidewall 2176 approximately orthogonally with respect to the first base insert sidewall portion 2200 (e.g., as illustrated in FIG. 23). In FIGS. 21 and 22, the insert sidewall 2176 is disposed parallel to the first base insert sidewall portion 2200. In this position, the second end 2272 of the insert sidewall 2176 and/or a second base insert sidewall portion 2230 can be disposed against the top portion 2150 (e.g., against base 2240 of top portion 2140) of the outer container 2110 to mechanically support the outer container 2110 in the open position (e.g., as illustrated in FIG. 21).

In some embodiments, each sidewall 2156 of the bottom portion 2150 includes the corresponding insert sidewall 2176 such that the outer container 2110 and/or the bottom portion 2150 includes the insert sidewalls 2176 and/or they are integrally formed together.

In other embodiments, the insert sidewalls 2176 are attached to the top portion 2150 of the outer container 2110. For example, the second base insert sidewall portion 2230 can be attached to the base 2250 of the top portion 2150 of the outer container 2110. The insert sidewalls 2176 can pivot inwardly or outwardly along a second fold line 2220, as illustrated in FIG. 22. The second base insert sidewall portion 2230 can be attached to the base 2240 of the top portion 2140 of the outer container 2110 with an adhesive (e.g., glue, tape, etc.), a staple, or another attachment mechanism. In addition or in the alternative, the second base insert sidewall portion 2230 can comprise an adhesive (e.g., glue, tape, etc.) to secure the insert sidewalls 2176 in the vertical/open position.

Each fold line 2220 can be disposed at approximately the same height, or a slightly greater (e.g., about 1% to about 5% greater) height than the height of the corresponding sidewall 2146 of the top portion 2140 such that the corresponding insert sidewall 2176 can be folded inwardly and disposed approximately orthogonally with respect to the second base insert sidewall portion 2230. Alternatively, the second base insert sidewall portion 2230 can be attached to the sidewall 2146 of the top portion 2140 of the outer container 2110.

In some embodiments, each sidewall 2146 of the top portion 2140 includes the corresponding insert sidewall 2176 such that the outer container 2110 and/or the top portion 2140 includes the insert sidewalls 2176 and/or they are integrally formed together.

It is noted that some of the figures include dimensions or other details regarding the litter box. Such dimensions and/or details are provided for illustrative and/or representative purposes and they are not intended to be limiting.

The invention should not be considered limited to the particular embodiments described above, but rather should be understood to cover all aspects of the invention as fairly set out in the attached claims. Various modifications, equivalent processes, as well as numerous structures to which the invention may be applicable, will be apparent to those skilled in the art to which the invention is directed upon review of this disclosure. The claims are intended to cover such modifications and equivalents.

What is claimed is:

1. A litter box comprising:
    a bottom tray having a bottom tray base, bottom tray sidewalls, a bottom tray front wall, and a bottom tray back wall;
    a top tray having a top tray base, top tray sidewalls, a top tray front wall, and a top tray back wall, the top tray pivotably attached to the bottom tray; and
    an insert comprising insert sidewalls that are attached to the bottom tray, each insert sidewall has a first end disposed proximal to the bottom tray front wall and a second end disposed proximal to the bottom tray back wall,
    wherein:
        in a closed state:
            the top tray is disposed on the bottom tray and a litter box cavity is defined between the bottom and top trays, and
            the insert sidewalls are pivoted inwardly such that the insert sidewalls are disposed in the litter box cavity,
        in an opened state:
            the top tray is pivoted away from the bottom tray,
            the insert sidewalls are pivoted outwardly such that the insert sidewalls extend from the bottom tray to the top tray, and
            the insert sidewalls mechanically support the top tray in the opened state,
        a height of each insert sidewall is determined with respect to an axis that is orthogonal to a plane defined by an inner exposed surface of the bottom tray base, and
        the height of each insert sidewall increases from the first end to the second end, and
        a separation distance between the bottom tray sidewalls is smaller at a first bottom tray end proximal to the bottom tray front wall than at a second bottom tray end proximal to the bottom tray back wall to encourage an animal to stand and/or sit in a rear of the bottom tray while facing towards a front of the bottom tray.

2. The litter box of claim 1, wherein each insert sidewall extends along a length of a corresponding bottom tray sidewall.

3. The litter box of claim 2, wherein the height at the first end of each insert sidewall is greater than a height of the corresponding bottom tray sidewall.

4. The litter box of claim 3, wherein the height at the first end of each insert sidewall is at least twice the height of the corresponding bottom tray sidewall.

5. The litter box of claim 1, wherein each insert sidewall is attached to a corresponding bottom tray sidewall.

6. The litter box of claim 5, wherein in the opened state each insert sidewall is releasably attached to the top tray.

7. The litter box of claim 6, wherein each insert sidewall is releasably attached to the top tray by a zip tie.

8. The litter box of claim 1, wherein a separation distance between the top tray sidewalls is smaller at a first top tray end proximal to the top tray front wall than at a second top tray end proximal to the top tray back wall.

9. The litter box of claim 1, wherein the bottom tray includes double-folded corners.

10. The litter box of claim 9, wherein each double-folded corner is disposed between the bottom tray base, the bottom tray back wall, and a corresponding bottom tray sidewall.

11. The litter box of claim 1, wherein the bottom tray comprises a waterproof or a water-resistant material.

12. The litter box of claim 1, wherein the insert sidewalls are integrally attached to the bottom tray.

13. The litter box of claim 1, wherein:
    in the closed state, each insert sidewall is pivoted inwardly about a fold line that extends parallel to a length of the corresponding bottom tray sidewall,
    in the opened state, each insert sidewall is pivoted outwardly about the fold line such that the insert sidewalls extend from the bottom tray to the top tray.

14. A litter box comprising:
    a bottom tray having a bottom tray base, bottom tray sidewalls, a bottom tray front wall, and a bottom tray back wall;
    a top tray having a top tray base, top tray sidewalls, a top tray front wall, and a top tray back wall, the top tray pivotably attached to the bottom tray; and
    an insert comprising insert sidewalls that are attached to the top tray,
    wherein:
        in a closed state:
            the top tray is disposed on the bottom tray and a litter box cavity is defined between the bottom and top trays, and
            the insert sidewalls are pivoted inwardly such that the insert sidewalls are disposed in the litter box cavity,
        in an opened state:
            the top tray is pivoted away from the bottom tray,
            the insert sidewalls are pivoted outwardly such that the insert sidewalls extend from the bottom tray to the top tray, and
            the insert sidewalls mechanically support the top tray in the opened state,
        a bottom tray separation distance between the bottom tray sidewalls is smaller at a first bottom tray end proximal to the bottom tray front wall than at a second bottom tray end proximal to the bottom tray back wall,
        a top tray separation distance between the top tray sidewalls is smaller at a first top tray end proximal to the top tray front wall than at a second top tray end proximal to the top tray back wall, each insert sidewall has a first end disposed proximal to the bottom tray front wall and a second end disposed proximal to the bottom tray back wall, and in the opened state:
a height of each insert sidewall is determined with respect to an axis that is orthogonal to a plane defined by an inner exposed surface of the bottom tray base, and the height of each insert sidewall increases from the first end to the second end.

15. The litter box of claim 14, wherein the height at the first end of each insert sidewall is greater than a height of the corresponding bottom tray sidewall.

16. The litter box of claim 14, wherein the bottom tray includes double-folded corners.

17. The litter box of claim 14, wherein:
in the closed state, each insert sidewall is pivoted inwardly about a fold line that extends parallel to a length of the corresponding top tray sidewall,
in the opened state, each insert sidewall is pivoted outwardly about the fold line such that the insert sidewalls extend from the top tray to the bottom tray.

18. A litter box comprising:
a bottom tray having a bottom tray base, bottom tray sidewalls, a bottom tray front wall, and a bottom tray back wall;
a top tray having a top tray base, top tray sidewalls, a top tray front wall, and a top tray back wall, the top tray pivotably attached to the bottom tray; and
an insert comprising insert sidewalls, each insert sidewall attached to a corresponding bottom tray sidewall,
wherein:
in a closed state:
the top tray is disposed on the bottom tray and a litter box cavity is defined between the bottom and top trays, and
the insert sidewalls are pivoted inwardly such that the insert sidewalls are disposed in the litter box cavity, in an opened state:
the top tray is pivoted away from the bottom tray,
the insert sidewalls are pivoted outwardly such that the insert sidewalls extend from the bottom tray to the top tray,
the insert sidewalls mechanically support the top tray in the opened state, and
each insert sidewall is releasably attached to the top tray, and
a separation distance between the bottom tray sidewalls is smaller at a first bottom tray end proximal to the bottom tray front wall than at a second bottom tray end proximal to the bottom tray back wall to encourage an animal to stand and/or sit in a rear of the bottom tray while facing towards a front of the bottom tray.

19. The litter box of claim 18, wherein in the opened state, a height of each insert sidewall is determined with respect to an axis that is orthogonal to a plane defined by an inner exposed surface of the bottom tray base.

20. The litter box of claim 19, wherein:
each insert sidewall has a first end disposed proximal to the bottom tray front wall and a second end disposed proximal to the bottom tray back wall, and
in the opened state, the height of each insert sidewall increases from the first end to the second end.

21. The litter box of claim 20, wherein each insert sidewall extends along a length of a corresponding bottom tray sidewall.

22. The litter box of claim 21, wherein the height at the first end of each insert sidewall is greater than a height of the corresponding bottom tray sidewall.

23. The litter box of claim 22, wherein the height at the first end of each insert sidewall is at least twice the height of the corresponding bottom tray sidewall.

24. The litter box of claim 18, wherein each insert sidewall is releasably attached to the top tray by a zip tie.

25. The litter box of claim 18, wherein a separation distance between the top tray sidewalls is smaller at a first top tray end proximal to the top tray front wall than at a second top tray end proximal to the top tray back wall.

26. The litter box of claim 18, wherein the bottom tray includes double-folded corners.

27. The litter box of claim 26, wherein each double-folded corner is disposed between the bottom tray base, the bottom tray back wall, and a corresponding bottom tray sidewall.

28. The litter box of claim 18, wherein the bottom tray comprises a waterproof or a water-resistant material.

29. The litter box of claim 18, wherein the insert sidewalls are integrally attached to the bottom tray.

30. The litter box of claim 18, wherein:
in the closed state, each insert sidewall is pivoted inwardly about a fold line that extends parallel to a length of the corresponding bottom tray sidewall,
in the opened state, each insert sidewall is pivoted outwardly about the fold line such that the insert sidewalls extend from the bottom tray to the top tray.

31. A litter box comprising:
a bottom tray having a bottom tray base, bottom tray sidewalls, a bottom tray front wall, and a bottom tray back wall;
a top tray having a top tray base, top tray sidewalls, a top tray front wall, and a top tray back wall, the top tray pivotably attached to the bottom tray; and
an insert comprising insert sidewalls that are attached to the top tray,
wherein:
in a closed state:
the top tray is disposed on the bottom tray and a litter box cavity is defined between the bottom and top trays, and
the insert sidewalls are pivoted inwardly such that the insert sidewalls are disposed in the litter box cavity,
in an opened state:
the top tray is pivoted away from the bottom tray,
the insert sidewalls are pivoted outwardly such that the insert sidewalls extend from the bottom tray to the top tray, and
the insert sidewalls mechanically support the top tray in the opened state,
a bottom tray separation distance between the bottom tray sidewalls is smaller at a first bottom tray end proximal to the bottom tray front wall than at a second bottom tray end proximal to the bottom tray back wall,
a top tray separation distance between the top tray sidewalls is smaller at a first top tray end proximal to the top tray front wall than at a second top tray end proximal to the top tray back wall,
in the closed state, each insert sidewall is pivoted inwardly about a fold line that extends parallel to a length of the corresponding top tray sidewall, and
in the opened state, each insert sidewall is pivoted outwardly about the fold line such that the insert sidewalls extend from the top tray to the bottom tray.

32. The litter box of claim 31, wherein:
each insert sidewall has a first end disposed proximal to the bottom tray front wall and a second end disposed proximal to the bottom tray back wall, and
In the opened state:
  a height of each insert sidewall is determined with respect to an axis that is orthogonal to a plane defined by an inner exposed surface of the bottom tray base, and
  the height of each insert sidewall increases from the first end to the second end.

33. The litter box of claim 32, wherein the height at the first end of each insert sidewall is greater than a height of the corresponding bottom tray sidewall.

34. The litter box of claim 31, wherein the bottom tray includes double-folded corners.

\* \* \* \* \*